United States Patent
Hongo et al.

(10) Patent No.: US 8,934,115 B2
(45) Date of Patent: Jan. 13, 2015

(54) PAPER CONVEYING APPARATUS

(71) Applicant: PFU Limited, Kahoku-shi, Ishikawa (JP)

(72) Inventors: Masanobu Hongo, Kahoku (JP); Takayuki Umi, Kahoku (JP)

(73) Assignee: PFU Limited, Kahoku-shi (JP)

( * ) Notice: Subject to any disclaimer, the term of this patent is extended or adjusted under 35 U.S.C. 154(b) by 0 days.

(21) Appl. No.: 14/178,616

(22) Filed: Feb. 12, 2014

(65) Prior Publication Data

US 2014/0327925 A1 Nov. 6, 2014

(30) Foreign Application Priority Data

May 2, 2013 (JP) .................................. 2013-097004

(51) Int. Cl.
*G06F 15/00* (2006.01)
*G06F 3/12* (2006.01)
*G06K 1/00* (2006.01)
*G06K 15/00* (2006.01)

(52) U.S. Cl.
CPC .................................. *G06K 15/4085* (2013.01)
USPC .......................................... 358/1.14; 358/1.1

(58) Field of Classification Search
CPC ... G06K 15/4085; G06K 15/00; G06K 15/02; G06F 3/1296; G06F 21/0098
USPC ................. 358/1.1, 1.14, 1.13, 1.15
See application file for complete search history.

(56) References Cited

U.S. PATENT DOCUMENTS

| | | | |
|---|---|---|---|
| 7,621,519 B2 * | 11/2009 | Sagawa et al. | 271/4.01 |
| 8,662,619 B2 * | 3/2014 | Nukui | 347/16 |
| 2009/0115126 A1 | 5/2009 | Liau et al. | |
| 2012/0235929 A1 | 9/2012 | Hongo et al. | |

FOREIGN PATENT DOCUMENTS

| | | |
|---|---|---|
| EP | 2 708 952 A2 | 3/2014 |
| JP | 57-157304 | 10/1982 |
| JP | 57-157304 U | 10/1982 |
| JP | 61-118897 A | 6/1986 |
| JP | 2001-302021 | 10/2001 |

(Continued)

OTHER PUBLICATIONS

Office action mailed on Mar. 18, 2014 in corresponding patent application No. JP 2013-097004, 8pp. including English translation.

(Continued)

*Primary Examiner* — Douglas Tran
(74) *Attorney, Agent, or Firm* — Christie, Parker & Hale, LLP.

(57) ABSTRACT

There are provided a paper conveying apparatus that can precisely determine the presence of occurrence of a jam by a jam sound. The paper conveying apparatus includes an analog sound signal generator for generating an analog sound signal corresponding to a sound generated by the paper during conveyance of the paper, a corrected signal generator for generating a signal acquiring the peak hold of the analog sound signal or a signal detecting the analog sound signal as a corrected signal, a digital converter for sampling the corrected signal and converting the corrected signal to a digital format to generate a digital sound signal, and a sound jam detector for determining whether a jam has occurred based on the digital sound signal.

6 Claims, 21 Drawing Sheets

(56) References Cited

FOREIGN PATENT DOCUMENTS

| | | |
|---|---|---|
| JP | 2007-121189 | 5/2007 |
| JP | 2008-092358 | 4/2008 |
| JP | 2012-193040 | 10/2012 |

OTHER PUBLICATIONS

European Search Report issued on Sep. 26, 2014 in corresponding European Application No. 14161435.4, 6pp.

* cited by examiner

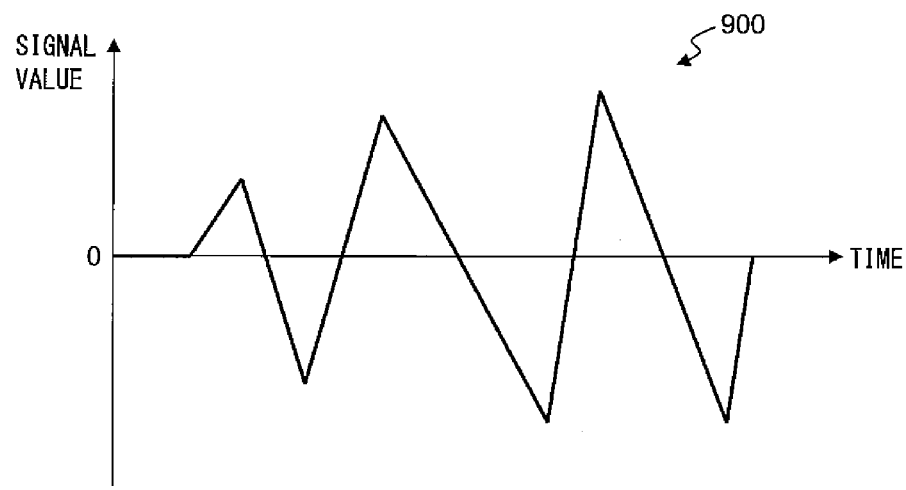
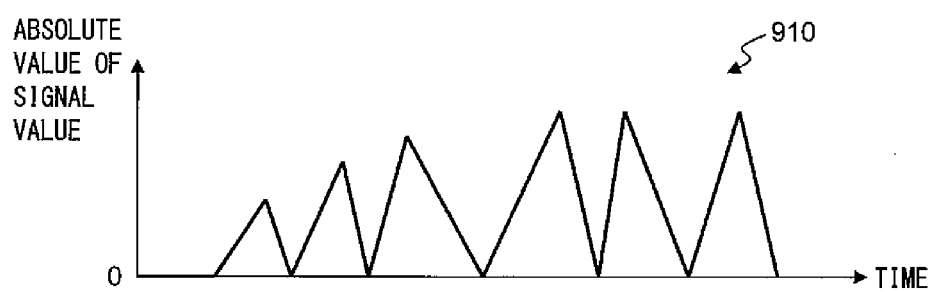
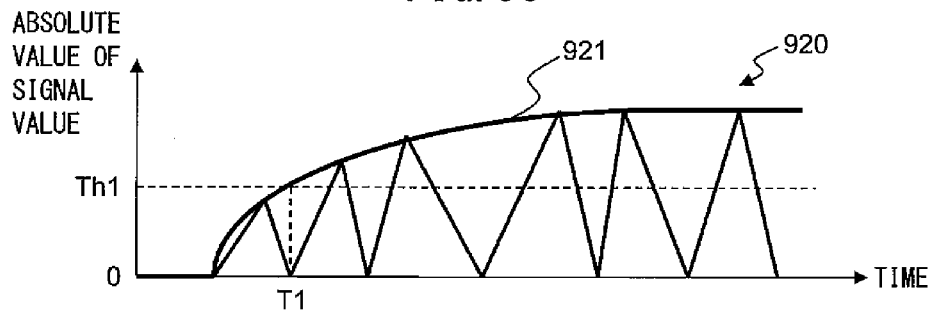

PAPER CONVEYING APPARATUS

CROSS-REFERENCE TO RELATED APPLICATIONS

This application is based upon and claims the benefit of priority of prior Japanese Patent Application No. 2013-097004, filed on May 2, 2013, the entire contents of which are incorporated herein by reference.

TECHNICAL FIELD

Embodiments discussed in the present specification relate to paper conveying technology.

BACKGROUND

In a paper conveying apparatus of an image reading apparatus, image copying apparatus, etc., sometimes a jam occurs when the paper moves along the conveyance path. In general, a paper conveying apparatus is provided with the function of determining whether a jam has occurred by a paper being conveyed to a predetermined position inside the conveyance path within a predetermined time from the start of conveyance of the paper and of stopping the operation of the apparatus when a jam has occurred.

On the other hand, if a jam occurs, a large sound is generated in the conveyance path, so the paper conveying apparatus can determine whether a jam has occurred based on the sound which is generated on the conveyance path and thereby detect the occurrence of a jam without waiting for the elapse of the predetermined time.

A paper feed apparatus has been disclosed which has a microphone which detects a sound generated in a paper conveyance path, pre-processes the signal of the sound detected by the microphone, and detects a jam of the paper based on the pre-processed sound signal (see Japanese Laid-Open Patent Publication No. 2012-193040).

Further, a ray measuring apparatus is provided at which a peak detection circuit is provided for detecting the peak value of the measured signal based on rays from a sample (see Japanese Laid-Open Patent Publication No. 2007-121189).

SUMMARY

When determining whether a jam has occurred based on a sound, if the length of the sound generated due to a jam is shorter than the interval for processing the sound signal, sometimes that sound cannot be accurately detected and the presence of occurrence of a jam cannot be accurately determined. Further, in the past, a peak detection circuit has been used for detecting the peak value of an input signal. It has not been used for deforming the waveform at an input signal and using the deformed waveform to perform a specific detection.

Accordingly, it is an object of the present invention to provide a paper conveying apparatus that can precisely determine the presence of occurrence of a jam by a jam sound.

According to an aspect of the apparatus, there is provided a paper conveying apparatus. The paper conveying apparatus includes an analog sound signal generator for generating an analog sound signal corresponding to a sound generated by the paper during conveyance of the paper, a corrected signal generator for generating a signal acquiring the peak hold of the analog sound signal or a signal detecting the analog sound signal as a corrected signal, a digital converter for sampling the corrected signal and converting the corrected signal to a digital format to generate a digital sound signal, and a sound jam detector for determining whether a jam has occurred based on the digital sound signal.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 9A is a graph which shows an example of a digital sound signal.

FIG. 9B is a graph which shows an example of a signal which acquires an absolute value of the digital sound signal.

FIG. 9C is a graph which shows an example of a shape signal.

DESCRIPTION OF EMBODIMENTS

Hereinafter, a paper conveying apparatus, jam detection method, and computer program according to an embodiment, will be described with reference to the drawings. However, note that the technical scope of the invention is not limited to these embodiments and extends to the inventions described in the claims and their equivalents.

Figure 1:
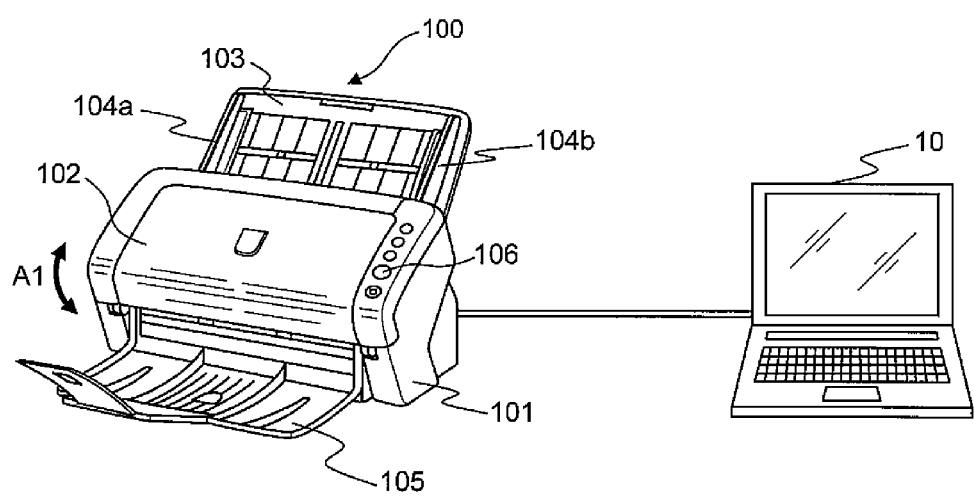
FIG. 1 is a perspective view which shows a paper conveying apparatus 100 and an information processing apparatus 10 according to an embodiment.

FIG. 1 is a perspective view which shows a paper conveying apparatus 100 which are configured as an image scanner, and an information processing apparatus 10, according to an embodiment.

The paper conveying apparatus 100 includes a lower housing 101, an upper housing 102, a paper tray 103, an ejection tray 105, an operation button 106, etc., and is connected to an information processing apparatus 10 (for example, personal computer, portable data terminal, etc.)

The lower housing 101 and the upper housing 102 are formed by plastic material. The upper housing 102 is arranged at a position which covers the top surface of the paper conveying apparatus 100 and is engaged with the lower housing 101 by hinges so as to be able to be opened and closed at the time of a paper jam, at the time of cleaning of the inside of the paper conveying apparatus 100, etc. For example, a document is an example of the paper.

The paper tray 103 is engaged with the lower housing 101 in a manner enabling a paper to be placed. The paper tray 103 is provided with side guides 104a and 104b which can be moved in a direction perpendicular to a conveyance direction of the paper, that is, to the left and right directions from the conveyance direction of the paper. By positioning the side guides 104a and 104b to match with the width of the paper, it is possible to limit the width direction of the paper.

The ejection tray 105 is engaged with the lower housing 101 by hinges so as to be able to pivot in the direction which is shown by an arrow mark A1. In the opened state as shown in FIG. 1, the ejected paper can be held.

The operation button 106 is arranged on the surface of the upper housing 102. If pushed, it generates and outputs an operation detection signal.

Figure 2:
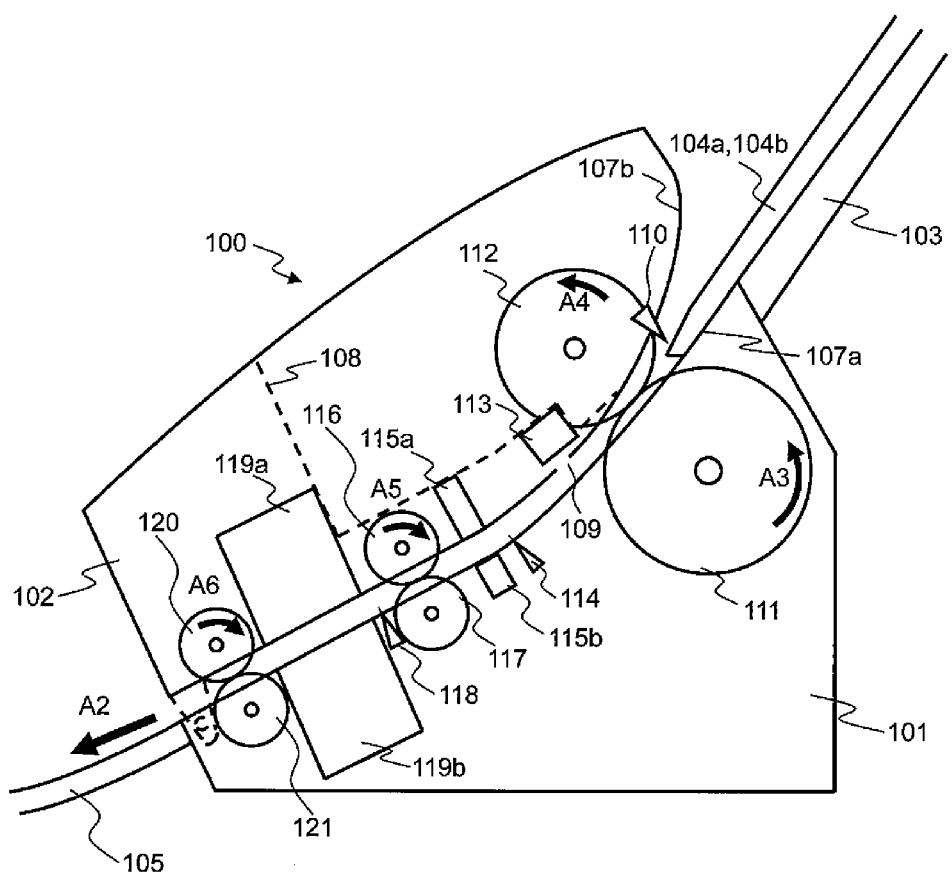
FIG. 2 is a view for explaining an example of a conveyance path at the inside of the paper conveying apparatus 100.

FIG. 2 is a view for explaining an example of the conveyance route at the inside of the paper conveying apparatus 100.

The conveyance route at the inside of the paper conveying apparatus 100 has a first paper detector 110, a paper feed roller 111, a retard roller 112, a microphone 113, a second paper detector 114, an ultrasonic transmitter 115a, an ultrasonic receiver 115b, a first conveyor roller 116, a first driven roller 117, a third paper detector 118, a first image capture unit 119a, a second image capture unit 119b, a second conveyor roller 120, a second driven roller 121, etc.

The top surface of the lower housing 101 forms the lower guide 107a of the conveyance path of the paper, while the bottom surface of the upper housing 102 forms the upper guide 107b of the conveyance path of the paper. In FIG. 2, the arrow mark A2 shows the conveyance direction of the paper. Below, "upstream" means upstream of the conveyance direction A2 of the paper, while "downstream" means downstream of the conveyance direction A2 of the paper.

The first paper detector 110 has a contact detection sensor which is arranged at an upstream side of the paper feed roller 111 and the retard roller 112 and detects if a paper is placed on the paper tray 103. The first paper detector 110 generates and outputs a first paper detection signal which changes in signal value between a state in which a paper is placed on the paper tray 103 and a state in which one is not placed.

The microphone 113 is an example of a sound detector, is provided near a conveyance path of a paper, and detects the sound generated by a paper during conveyance of the paper, and generates and outputs an analog signal corresponding to the detected sound. The microphone 113 is arranged at the downstream side of the paper feed roller 111 and the retard roller 112 while fastened to the frame 108 at the inside of the upper housing 102. A hole 109 is provided in the upper guide 107b facing the microphone 113, so that the sound generated by the paper during conveyance of the paper can be more accurately detected by the microphone 113.

The second paper detector 114 has a contact detection sensor which is arranged at a downstream side of the paper feed roller 111 and the retard roller 112 and at an upstream side of the first conveyor roller 116 and first driven roller 117 and detects if there is a paper present at that position. The second paper detector 114 generates and outputs a second paper detection signal which changes in signal value between a state at which there is a paper at that position and a state where there is no paper there.

The ultrasonic transmitter 115a and the ultrasonic receiver 115b are an example of an ultrasonic detector, and are arranged near the conveyance path of the paper so as to face each other across the conveyance path. The ultrasonic transmitter 115a transmits an ultrasonic wave. On the other hand, the ultrasonic receiver 115b detects an ultrasonic wave which is transmitted by the ultrasonic transmitter 115a and passes through the paper or papers, and generates and outputs an ultrasonic signal comprised of an electrical signal corresponding to the detected ultrasonic wave. Below, the ultrasonic transmitter 115a and the ultrasonic receiver 115b will sometimes be referred to altogether as the "ultrasonic sensor 115".

The third paper detector 118 has a contact detection sensor which is arranged at a downstream side of the first conveyor roller 116 and the first driven roller 117 and an upstream side of the first image capture unit 119a and the second image capture unit 119b and detects if there is a paper at that position. The third paper detector 118 generates and outputs a third paper detection signal which changes in signal value between a state where there is a paper at that position and a state where there is no such paper there.

The first image capture unit 119a has a CIS (contact image sensor) of an equal magnification optical system type which is provided with an image capture element using CMOS's (complementary metal oxide semiconductors) which are arranged in a line in the main scan direction. This CIS reads the back surface of the paper and generates and outputs an analog image signal. Similarly, the second image capture unit 119b has a CIS of an equal magnification optical system type which is provided with an image capture element using CMOS's which are arranged in a line in the main scan direction. This CIS reads the front surface of the paper and generates and outputs an analog image signal. Note that, it is also possible to arrange only one of the first image capture unit 119a and the second image capture unit 119b and read only one surface of the paper. Further, instead of a CIS, it is also possible to utilize an image capturing sensor of a reduced magnification optical system type using CCD's (charge coupled devices). Below, the first image capture unit 119a and the second image capture unit 119b will sometimes be referred to overall as the "image capture units 119".

A paper which is placed on the paper tray 103 is conveyed between the lower guide 107a and the upper guide 107b toward the paper conveyance direction A2 by rotation of the paper feed roller 111 in the direction of the arrow mark A3 of FIG. 2. The retard roller 112 rotates in the direction of the arrow mark A4 of FIG. 2 at the time of paper conveyance. Due to the action of the paper feed roller 111 and the retard roller 112, when the paper tray 103 has a plurality of papers placed on it, among the papers which are placed on the paper tray 103, only the paper which is in contact with the paper feed roller 111 is separated. The conveyance of papers other than the separated paper is restricted (prevention of multifeed). The paper feed roller 111 and the retard roller 112 function as a paper separator.

A paper is fed between the first conveyor roller 116 and the first driven roller 117 while being guided by the lower guide 107a and the upper guide 107b. The paper is sent between the first image capture unit 119a and the second image capture unit 119b by the first conveyor roller 116 rotating in the direction of the arrow mark A5 of FIG. 2. The paper which is read by the image capture unit 119 is ejected onto the ejection tray 105 by the second conveyor roller 120 rotating in the direction of the arrow mark A6 of the FIG. 2.

Figure 3:
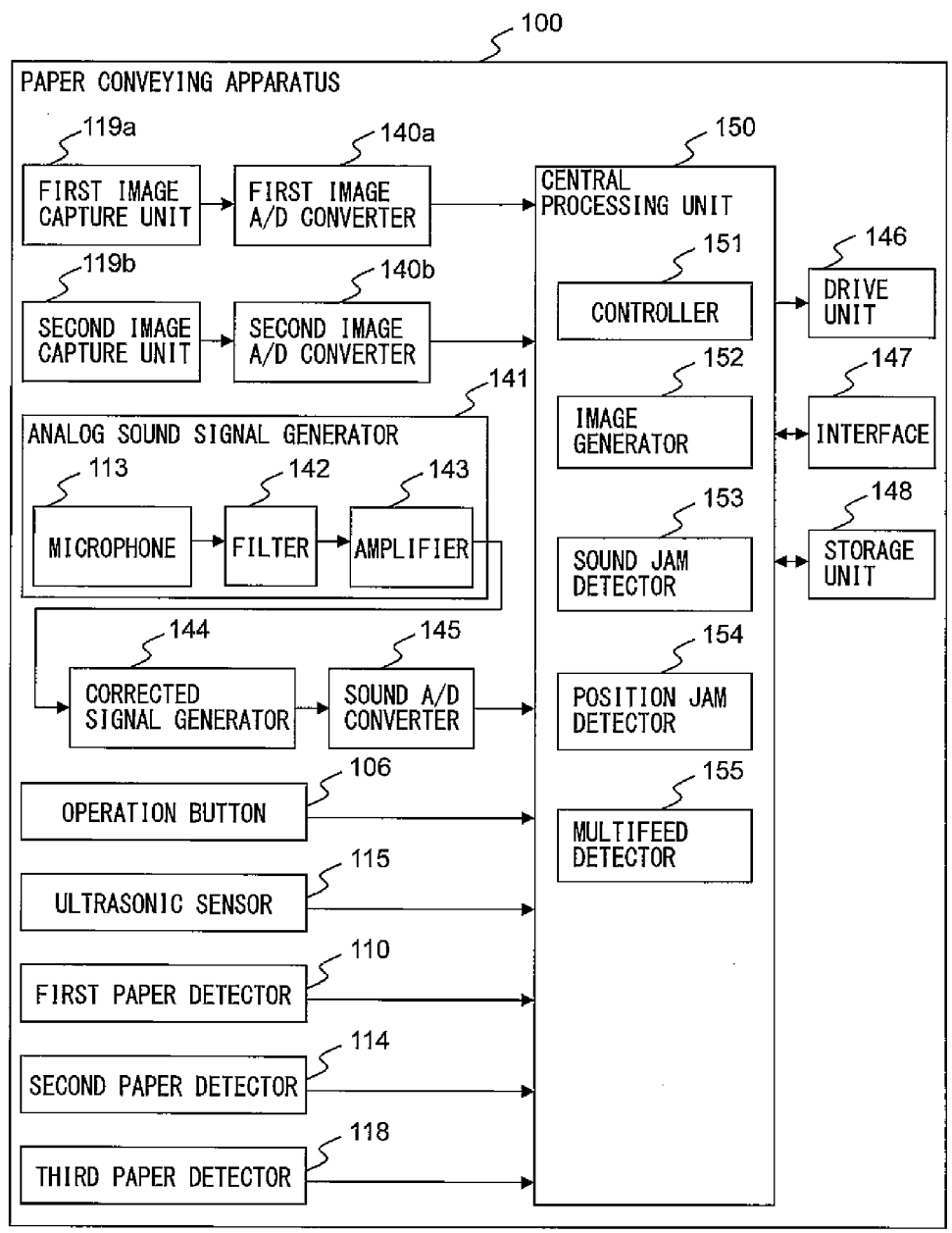
FIG. 3 is a block diagram which shows an example of the schematic configuration of the paper conveying apparatus 100.

FIG. 3 is an example of a block diagram which shows the general configuration of a paper conveying apparatus 100.

The paper conveying apparatus 100, in addition to the above-mentioned configuration, further has a first image A/D converter 140a, a second image A/D converter 140b, an analog sound signal generator 141, a corrected signal generator 144, a sound A/D converter 145, a drive unit 146, an interface 147, a storage unit 148, a central processing unit 150, etc.

The first image A/D converter 140a converts an analog image signal which is output from the first image capture unit 119a from an analog to digital format to generate digital image data which it then outputs to the central processing unit 150. Similarly, the second image A/D converter 140b converts the analog image signal which is output from the second image capture unit 119b from an analog to digital format to generate digital image data which it then outputs to the central processing unit 150. Below, these digital image data will be referred to as the "read image".

The analog sound signal generator 141 includes a microphone 113, a filter 142, an amplifier 143, etc., and generates an analog sound signal. The filter 142 applies a bandpass filter which passes a predetermined frequency band of a signal to an analog signal which is output from the microphone 113 and outputs it to the amplifier 143. The amplifier 143 amplifies the signal which is output from the filter 142 and outputs it to the corrected signal generator 144. Below, a signal which is output by the analog sound signal generator 141 will be referred to as an "analog sound signal".

Note that, the analog sound signal generator 141 is not limited to this. The analog sound signal generator 141 may include only the microphone 113, while the filter 142 and the amplifier 143 may be provided outside of the analog sound signal generator 141. Further, the analog sound signal generator 141 may include only the microphone 113 and the filter 142, and the amplifier 143 may be provided outside of the analog sound signal generator 141.

The corrected signal generator 144 generates a signal holding peaks of the analog sound signal output from the analog sound signal generator 141 every first interval (for example 200 μsec), as a corrected signal and outputs it to the sound A/D converter 145. Details of the corrected signal generator 144 will be explained later.

The sound A/D converter 145 samples the corrected signal output from the corrected signal generator 144 every first interval, converts it to a digital format to generate a digital sound signal, and outputs it to the central processing unit 150.

The drive unit 146 includes one or more motors and uses control signals from the central processing unit 150 to rotate the paper feed roller 111, the retard roller 112, the first conveyor roller 116, and the second conveyor roller 120 and operate to convey a paper.

The interface 147 has, for example, a USB or other serial bus-based interface circuit and electrically connects with the information processing apparatus 10 to send and receive a read image and various types of information. Further, it is also possible to connect a flash memory etc., to the interface 147 so as to store the read image.

The storage unit 148 has a RAM (random access memory), ROM (read only memory), or other memory device, a hard disk or other fixed disk device, or flexible disk, optical disk, or other portable storage device. Further, the storage unit 148 stores a computer program, database, tables, etc., which are used in various processing of the paper conveying apparatus 100. The computer program may be installed on the storage unit 148 from a computer-readable, non-transitory medium such as a compact disk read only memory (CD-ROM), a digital versatile disk read only memory (DVD-ROM), or the like by using a well-known setup program or the like. Furthermore, the storage unit 148 stores the read images.

The central processing unit 150 is provided with a CPU (central processing unit) and operates based on a program which is stored in advance in the storage unit 148. Note that, the central processing unit 150 may also be comprised of a DSP (digital signal processor), LSI (large scale integrated circuit), ASIC (application specific integrated circuit), FPGA (field-programming gate array), etc.

The central processing unit 150 is connected to the operation button 106, first paper detector 110, second paper detector 114, ultrasonic sensor 115, third paper detector 118, first image capture unit 119a, second image capture unit 119b, first image A/D converter 140a, second image A/D converter 140b, analog sound signal generator 141, corrected signal generator 144, sound A/D converter 145, drive unit 146, interface 147, and storage unit 148 and controls these units.

The central processing unit 150 control a drive operation of the drive unit 146, control a paper read operation of the image capture unit 119, etc., to acquire a read image. Further, the central processing unit 150 has a control module 151, an image generator 152, a sound jam detector 153, a position jam detector 154, a multifeed detector 155, etc. These units are functional modules which are realized by software which operate on a processor. Note that, these units may be comprised of respectively independent integrated circuits, a microprocessor, firmware, etc.

Figure 4:
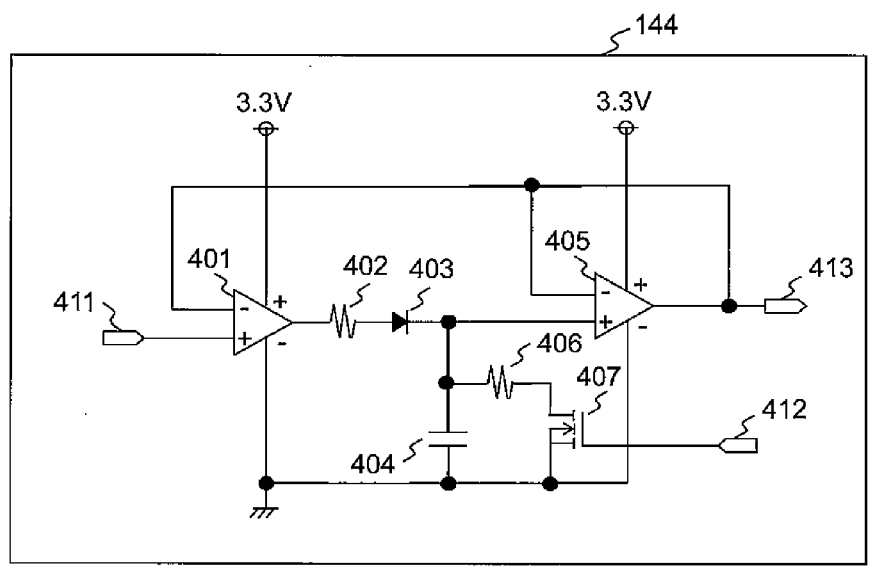
FIG. 4 is a view which shows an example of a circuit which forms part of the corrected signal generator 144.

FIG. 4 shows an example of a circuit which forms part of the corrected signal generator 144.

As shown in FIG. 4, the corrected signal generator 144 has operational amplifiers 401, 405, resistors 402, 406, a diode 403, capacitor 404, n-channel type FET (field effect transistor) 407, etc. The input terminal 411 is connected with the analog sound signal generator 141, while the input terminal 412 and output terminal are connected with the sound A/D converter 145.

A non-inverted input terminal of the operational amplifier 401 is connected to the input terminal 411, an inverted input terminal is connected to an output terminal of the operational amplifier 405, and that output terminal is connected through the resistor 402 to an anode of the diode 403. A cathode of the diode 403 is connected to one end of the capacitor 404. The other end of the capacitor 404 is connected to the ground. A non-inverted input terminal of the operational amplifier 405 is connected to a cathode of the diode 403 and one end of the capacitor 404, an inverted input terminal is connected to an output terminal, and the output terminal is further connected to the output terminal 413 and the inverted input terminal of the operational amplifier 401. A gate terminal of the re-channel type FET 407 is connected to an input terminal 412, a drain terminal is connected through a resistor 406 to one end of the capacitor 404, and a source terminal is connected to the other end of the capacitor 404 and the ground.

The operational amplifier 401 operates as a comparator. The input voltage from the input terminal 411 charges the capacitor 404 until the operational amplifier 405 reaches a voltage corresponding to the output voltage which outputs to the output terminal 413. When the input voltage reaches a voltage corresponding to the output voltage, discharge of the capacitor 404 is inhibited by the diode 403 and the voltage corresponding to the input voltage is held at the capacitor 404. On the other hand, the operational amplifier 405 operates as an impedance conversion circuit which outputs the voltage which was held at the capacitor 404 converted to impedance. Furthermore, if a predetermined voltage is applied from the input terminal 412 to the gate terminal of the re-channel type FET 407, a drain current flows to the re-channel type FET 407 and the charge of the capacitor 404 is discharged. The size of the resistor 406 is set to a size by which when the charge of the capacitor 404 is discharged, it is discharged in a sufficiently short time within the maximum drain current specification of the n-channel type FET 407.

The sound A/D converter 145 inputs to the input terminal 412 a pulse signal which becomes a voltage value of a predetermined voltage or more at a timing when sampling the corrected signal output from the corrected signal generator 144, that is, each first interval, and becomes a voltage value of less than the predetermined voltage at other timings. Therefore, the corrected signal generator 144 outputs a signal which holds the peak value in the first interval of the analog sound signal output from the analog sound signal generator 141, as the corrected signal to the sound A/D converter 145.

Figure 5A:
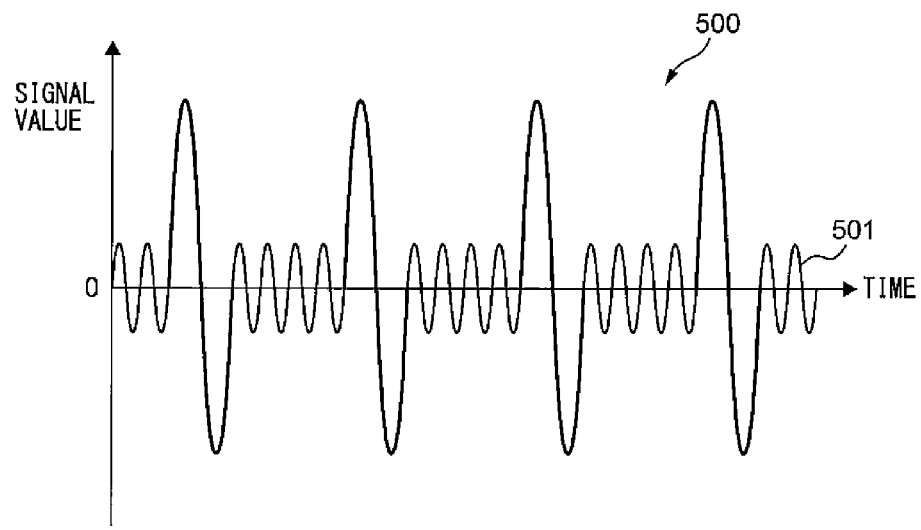
FIG. 5A is a graph which shows an example of an analog sound signal.
Figure 5B:
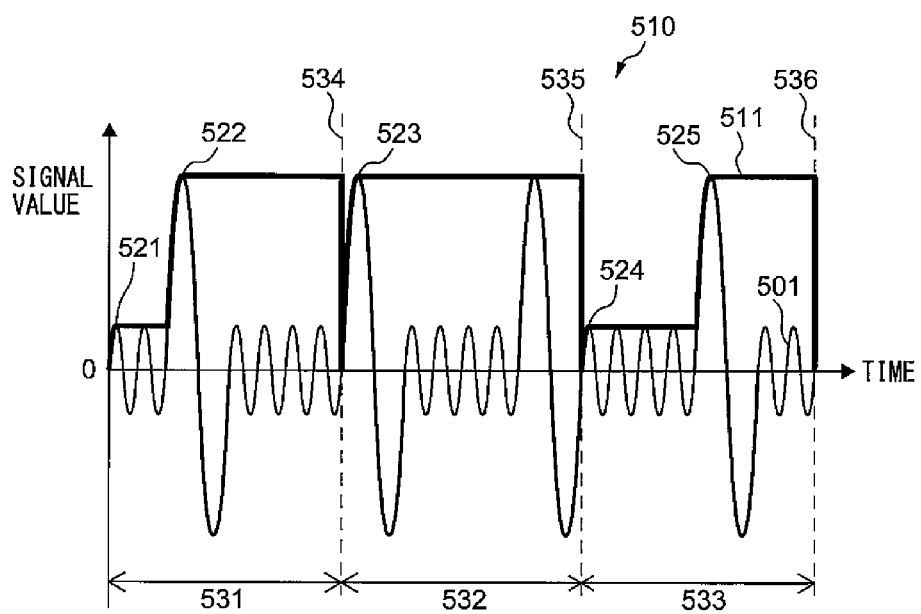
FIG. 5B is a graph which shows an example of a corrected signal.

FIG. 5A is a graph which shows an example of the analog sound signal output from the analog sound signal generator 141, while FIG. 5B is a graph which shows an example of the corrected signal.

The graph 500 which is shown in FIG. 5A shows an example of the analog sound signal 501 output from the analog sound signal generator 141, while the graph 510 which is shown in FIG. 5B shows an example of the corrected signal 511 acquired by correcting the analog sound signal 501. In FIG. 5A and FIG. 5B, the abscissas show the time, while the ordinates show the signal value.

In FIG. 5B, sections 531 to 533 show the first intervals. The corrected signal 511 becomes a signal where, in the interval 531, first peak value 521 of the analog sound signal 501 is held, then a peak value 522 larger than the peak value 521 is held. The held peak value 522 is sampled and reset by the sound A/D converter 145 at the end timing 534 of the section 531. In the sections 532 and 533 as well, in the same way, the corrected signal 511 becomes a signal where the peak values 523, 524, and 525 are held. The held peak values are sampled and reset by the sound A/D converter 145 at the end timings 535 and 536 of sections 532 and 533.

Note that, peak values held by the peak hold signal can attenuate slightly by self discharge of the capacitor 404. In this way, the peak hold signal includes not only one which completely holds the peak values, but also one where the held signals slightly attenuate.

If holding the peak values of the sound signal generated for the purpose of detecting a jam, the signal becomes one in which the original sound is not correctly expressed, so in the past the practice had not been to hold the peak values of the sound signal. However, as explained above, by holding the peak values of the analog sound signal to generate a corrected signal, even if the length of the sound generated by a jam is short, the sound can be reliably included in the corrected signal.

Further, in the past, to precisely detect the sound generated due to a jam, it was necessary to shorten the sampling interval for converting the analog sound signal to a digital format and perform the later explained sound jam detection processing with a high frequency, so the paper conveying apparatus required a high performance CPU. The sound generated due to a jam tends to include many 6 kHz or so frequency components, so to generate a digital sound signal which is suitable for sound jam detection processing, it was necessary to sample the analog sound signal by a 12 kHz or more sampling frequency based on the sampling theorem. On the other hand, the paper conveying apparatus 100 can reliably detect the sound generated due to a jam even if the sampling interval is long (for example, even with a sampling frequency of less than 12 kHz), so it becomes possible to lower the processing load of the CPU. Note that, PPC (plain paper copier) paper was used to run an experiment for causing a jam. As a result, it was confirmed that if making the sampling frequency of the analog/digital conversion 100 Hz or more, it is possible to suitably detect a jam.

Figure 6:
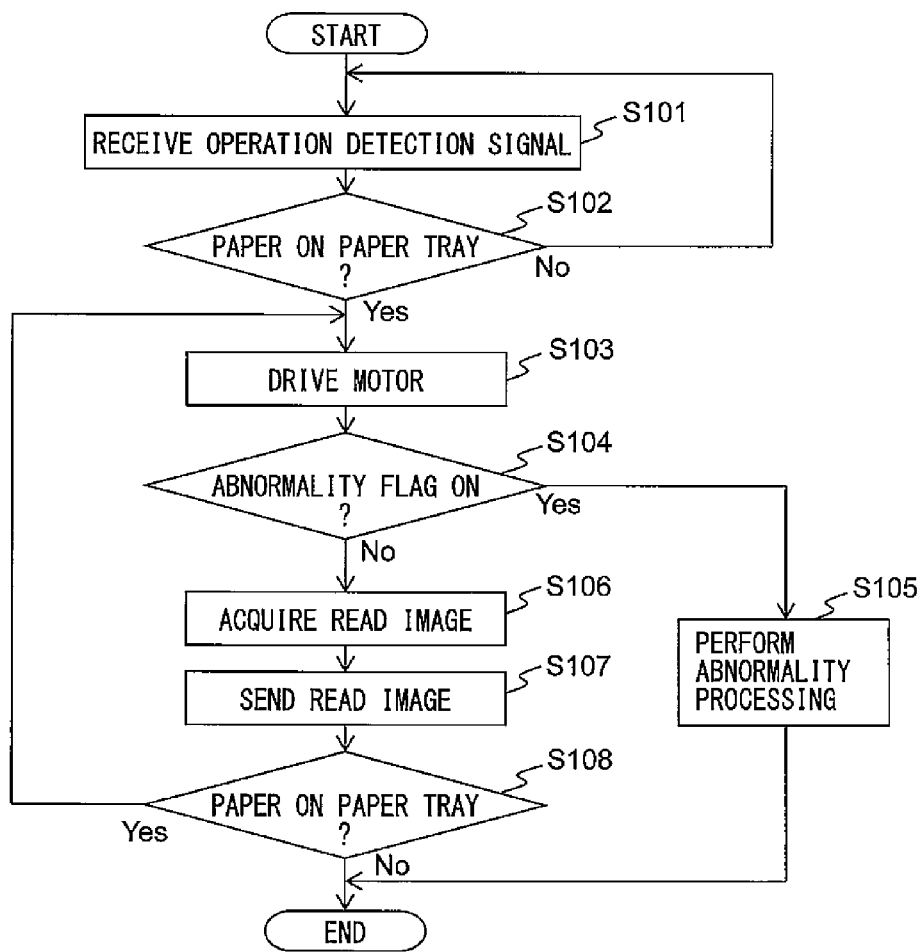
FIG. 6 is a flow chart which shows an example of the operation of the overall processing of the paper conveying apparatus 100.

FIG. 6 is a flow chart which shows an example of operation of overall processing of the paper conveying apparatus 100.

Below, referring to the flow chart which is shown in FIG. 6, an example of the operation of the overall processing of the paper conveying apparatus 100 will be explained. Note that, the flow of the operation which is explained below is performed based on a program which is stored in advance in the storage unit 148 mainly by the central processing unit 150 in cooperation with the elements of the paper conveying apparatus 100.

First, the central processing unit 150 stands by until a user pushes the operation button 106 and an operation detection signal is received from the operation button 106 (step S101).

Next, the central processing unit 150 determines whether the paper tray 103 has a paper placed on it based on the first paper detection signal which was received from the first paper detector 110 (step S102).

If the paper tray 103 does not have a paper placed on it, the central processing unit 150 returns the processing to step S101 and stands by until newly receiving an operation detection signal from the operation button 106.

On the other hand, when the paper tray 103 has a paper placed on it, the central processing unit 150 drives the drive unit 146 to rotate the paper feed roller 111, retard roller 112, first conveyor roller 116, and second conveyor roller 121 and convey the paper (step S103).

Next, the control module 151 determines whether an abnormality flag is ON or not (step S104). This abnormality flag is set OFF at the time of startup of the paper conveying apparatus 100 and is set ON if a later explained abnormality detection processing determines that an abnormality has occurred.

When the abnormality flag is ON, the control module 151, as an abnormal processing, stops the drive unit 146 to stop the conveyance of the paper, uses a not shown speaker, LED (light emitting diode), etc. to notify the user of the occurrence of an abnormality, sets the abnormality flag OFF (step S105), and ends the series of steps.

On the other hand, when the abnormality flag is not ON, the image generator 152 makes the first image capture unit 119a and the second image capture unit 119b read the conveyed paper and acquires the read image through the first image A/D converter 140a and the second image A/D converter 140b (step S106).

Next, the central processing unit 150 transmits the acquired read image through the interface 147 to a not shown information processing apparatus (step S107). Note that, when not connected to an information processing apparatus, the central processing unit 150 stores the acquired read image in the storage unit 148.

Next, the central processing unit 150 determine whether the paper tray 103 has a paper remaining thereon based on the first paper detection signal which was received from the first paper detector 110 (step S108).

When the paper tray 103 has a paper remaining thereon, the central processing unit 150 returns the processing to step S103 and repeats the processing of steps S103 to S108. On the other hand, when the paper tray 103 does not have any paper remaining thereon, the central processing unit 150 ends the series of processing.

Figure 7:
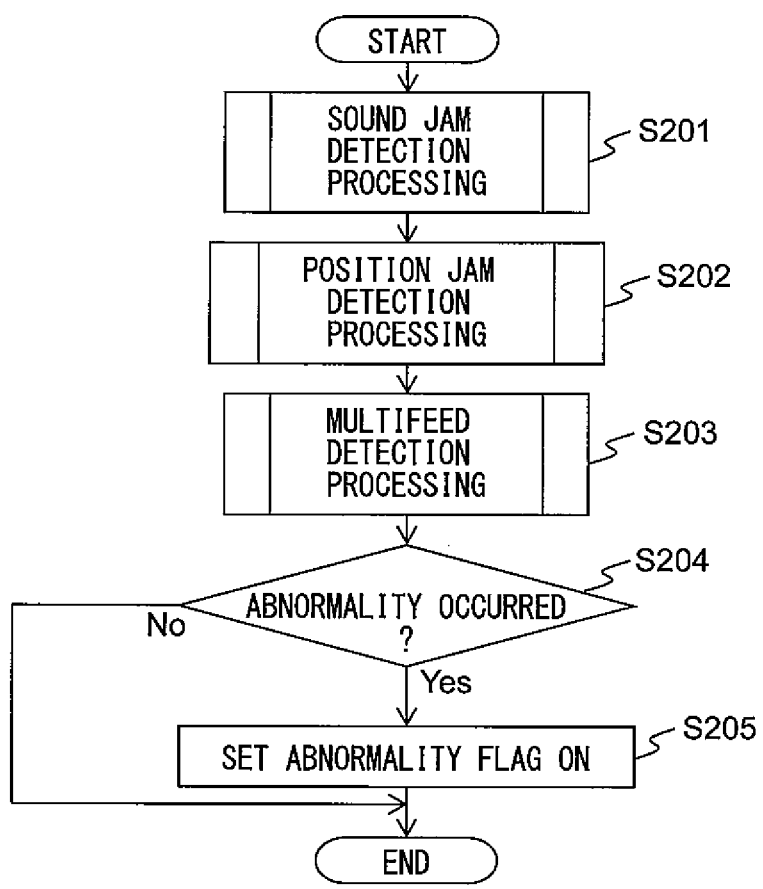
FIG. 7 is a flow chart which shows an example of the operation of an abnormality detection processing.

FIG. 7 is a flow chart which shows an example of an abnormality detection of the paper conveyance of the paper conveying apparatus 100.

The flow of operation which is explained below is executed based on a program which is stored in advance in the storage unit 148 mainly by the central processing unit 150 in cooperation with the elements of the paper conveying apparatus 100.

First, the sound jam detector 153 executes sound jam detection processing (step S201). In the sound jam detection processing, the sound jam detector 153 determines whether a jam has occurred based on the digital sound signal which was acquired from the sound A/D convertor 245. Below, sometimes a jam which is determined to exist by the sound jam detector 153 based on a digital sound signal will be called a "sound jam". Details of the sound jam detection processing will be explained later.

Next, the position jam detector 154 performs position jam detection processing (step S202). In the position jam detection processing, the position jam detector 154 determines the occurrence of a jam based on the second paper detection signal which is acquired from the second paper detector 114 and the third paper detection signal which is acquired from the third paper detector 118. Below, sometimes a jam which is determined to exist by the position jam detector 154 based on the second paper detection signal and third paper detection signal will be called a "position jam". Details of the position jam detection processing will be explained later.

Next, the multifeed detector 155 performs multifeed detection processing (step S203). In the multifeed detection processing, the multifeed detector 155 determines the occurrence of a multifeed of papers based on the ultrasonic signal which was acquired from the ultrasonic sensor 116. Details of the multifeed detection processing will be explained later.

Next, the control module 151 determines whether an abnormality has occurred in the paper conveyance processing (step S204). The control module 151 determines that an abnormality has occurred if at least one of a sound jam, position jam, and paper multifeed has occurred. That is, it is determined that no abnormality has occurred when none of a sound jam, position jam, or paper multifeed has occurred.

The control module 151 sets the abnormality flag to ON (step S205) and ends the series of steps when an abnormality occurs in the paper conveyance processing. On the other hand, when no abnormality occurs in the paper conveyance processing, it ends the series of steps without particularly performing any further processing. Note that, the flow chart which is shown in FIG. 5 is repeatedly executed every predetermined time interval.

Figure 8:
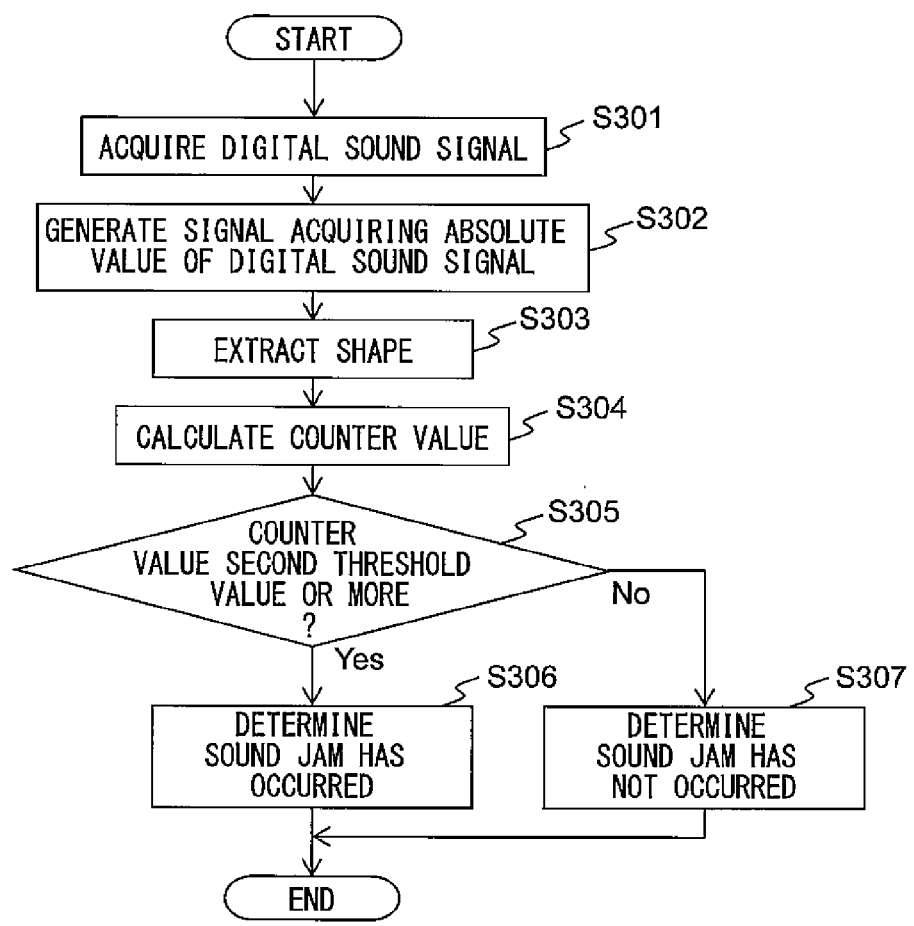
FIG. 8 is a flow chart which shows an example of the operation of a sound jam detection processing.

FIG. 8 is a flow chart which shows an example of operation of a sound jam detection processing.

The flow of operation which is shown in FIG. 8 is executed at step S201 of the flow chart which is shown in FIG. 7.

First, the sound jam detector 153 acquires a digital sound signal from the sound A/D converter 145 (step S301).

FIG. 9A is a graph which shows an example of a digital sound signal. The graph 900 which is shown in FIG. 9A shows a digital sound signal which is acquired from the sound A/D converter 145. The abscissa of graph 900 shows the time, while the ordinate shows the signal value of the digital sound signal.

Next, the sound jam detector 153 generates a signal of the absolute value of the digital sound signal received from the sound A/D converter 145 (step S302).

FIG. 9B is a graph which shows an example of the signal of the absolute value of the digital sound signal. The graph 910 which is shown in FIG. 9B shows the signal of the absolute value of the digital sound signal of the graph 900. The abscissa of graph 910 shows the time, while the ordinate shows the absolute value of the signal value.

Next, the sound jam detector 153 generates a shape signal which extracts the shape of the signal acquiring the absolute value of the digital sound signal (step S303). The sound jam detector 153 extracts an envelope as the shape signal.

FIG. 9C is a graph which shows an example of the shape signal. The graph 920 which is shown in FIG. 9C shows the envelope 921 of the signal acquiring the absolute value of the digital sound signal of the graph 910. In the graph 920, the abscissa shows the time, while the ordinate shows the absolute value of the signal value.

Next, the sound jam detector 153 calculates a counter value which increases when the shape signal is a first threshold value Th1 or more and decreases when it is less than the first threshold value Th1 (step S304). The sound jam detector 153 determines that the value of the envelope 921 is the first threshold value Th1 or more every predetermined time interval (for example, sampling interval of analog/digital conversion), increments the counter value when the value of the envelope 921 is the first threshold value Th1 or more, and decrements the counter value when it is less than the first threshold value Th1.

Figure 9D:
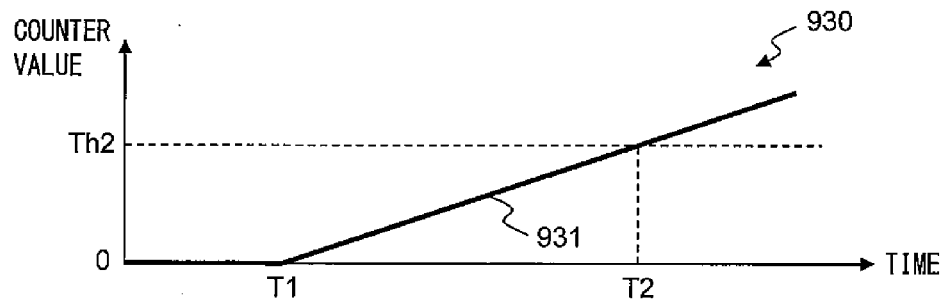
FIG. 9D is a graph which shows an example of a counter value.

FIG. 9D is a graph which shows an example of the counter value which is calculated for the shape signal. The graph 930 which is shown in FIG. 9D expresses the counter value which is calculated for the envelope 921 of the graph 920. The abscissa of graph 920 shows the time, while the ordinate shows the counter value.

Next, the sound jam detector 153 determines whether the counter value is a second threshold value Th2 or more (step S305). The sound jam detector 153 determines that a sound jam has occurred if the counter value is the second threshold value Th2 or more (step S306), determines that a sound jam has not occurred if the counter value is less than the second threshold value Th2 (step S307), and then ends the series of steps.

In FIG. 9C, the envelope 921 is the first threshold value Th1 or more at the time T1 and thereafter does not become less than the first threshold value Th1. For this reason, as shown in FIG. 9D, the counter value increases from the time T1 and becomes the second threshold value Th2 or more at the time T2, then the sound jam detector 153 determines that a sound jam has occurred.

Note that, at step S303, instead of finding the envelope, the sound jam detector 153 may also generate as the shape signal a signal acquiring the peak hold of acquiring the absolute value of the digital sound signal every second interval (below, called a "peak hold signal"). This peak hold signal includes not only a signal holding the peak value in the second interval in the respective intervals, but also a signal which holds the peak value for only the second interval. For example, the central processing unit 150 holds the local maximum value of the signal acquiring the absolute value of the digital sound signal for exactly the second interval and then makes it attenuate by a constant attenuation rate so as to generate the peak hold signal. Note that, the second interval is set to a time longer than the first interval (for example, 15 msec).

Figure 10A:
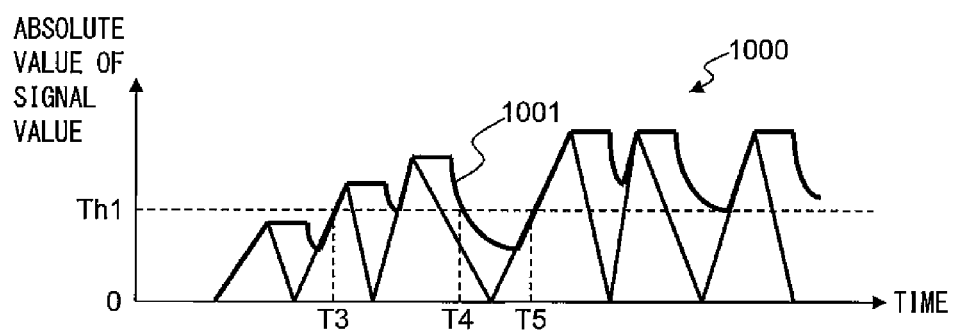
FIG. 10A is a graph which shows an example of a peak hold signal.
Figure 10B:
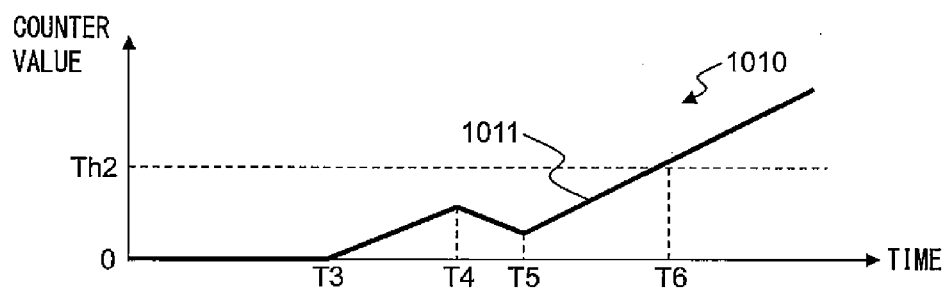
FIG. 10B is a graph which shows an example of a counter value.

FIG. 10A and FIG. 10B are views for explaining the processing for generating a peak hold signal from a digital sound signal to determine whether a sound jam has occurred.

The graph 1000 which is shown in FIG. 10A shows a peak hold signal 1001 for a signal acquiring the absolute value of the digital sound signal of the graph 910. In the graph 1000, the abscissa shows the time, while the ordinate shows the absolute value of the signal value.

The graph 1010 which is shown in FIG. 10B shows a counter value 1011 calculated for the peak hold signal 1001 of the graph 1000. In the graph 1010, the abscissa shows the time, while the ordinate shows the counter value. The peak hold signal 1001 becomes the first threshold value Th1 or more at the time T3, becomes less than the first threshold value Th1 at the time T4, and again becomes the first threshold value Th1 or more at the time T5. After that, it does not become less than the first threshold value Th1. For this reason, as shown in FIG. 10B, the counter value 1011 increases from the time T3, decreases from the time T4, again increases from the time T5, and becomes the second threshold value Th2 or more at the time T6, whereupon it is determined that a sound jam has occurred.

In this way, by determining whether a sound jam has occurred based on the peak hold signal, even if the sound generated by a jam is a sound which repeatedly increases and decreases, it becomes possible to precisely determine whether a sound jam has occurred.

Further, the sound jam detector 153 may generate as a shape signal a signal which applies a known smoothing filter, averaging filter, or low pass filter to a signal acquiring the absolute value of the digital sound signal.

Figure 11:
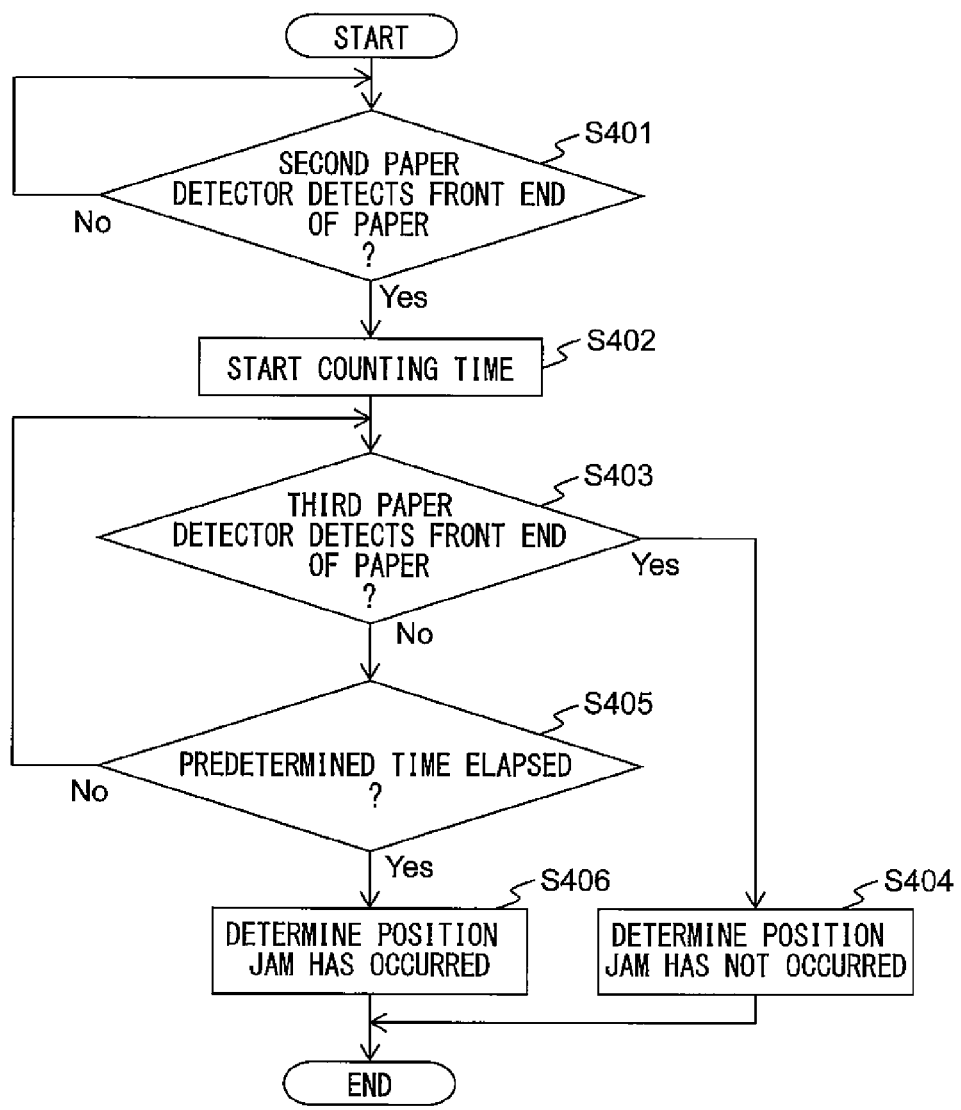
FIG. 11 is a flow chart which shows an example of the operation of a position jam detection processing.

FIG. 11 is a flow chart which shows an example of operation of a position jam detection processing.

The flow of operation which is shown in FIG. 11 is executed at step S202 of the flow chart which is shown in FIG. 7.

First, the position jam detector 154 stands by until the front end of the paper is detected by the second paper detector 114 (step S401). The position jam detector 154 determines that the front end of the paper is detected at the position of the second paper detector 114, that is, downstream of the paper feed roller 111 and retard roller 112 and upstream of the first conveyor roller 116 and first driven roller 117, when the value of the second paper detection signal from the second paper detector 114 changes from a value which shows the state where there is no paper to a value which shows the state where there is one.

Next, when the second paper detector 114 detects the front end of a paper, the position jam detector 154 starts counting time (step S402).

Next, the position jam detector 154 determines whether the third paper detector 118 has detected the front end of the paper (step S403). The position jam detector 154 determines that the front end of the paper is detected at the position of the third paper detector 118, that is, downstream of the first conveyor roller 116 and first driven roller 117 and upstream of the image capture unit 119, when the value of the third paper detection signal from the third paper detector 118 changes from a value which shows the state where there is no paper to a value which shows the state where there is one.

When the third paper detector 118 detects the front end of a paper, the position jam detector 154 determines that no position jam has occurred (step S404) and ends the series of steps.

On the other hand, if the third paper detector 118 detects the front end of the paper, the position jam detector 154 determines whether a predetermined time (for example, 1 second) has elapsed from the start of counting time (step S405). If a predetermined time has not elapsed, the position jam detector 154 returns to the processing of step S403 and again determines whether the third paper detector 118 has detected the front end of the paper. On the other hand, when a predetermined time has elapsed, the position jam detector 154 determines that position jam has occurred (step S406) and ends the series of steps. Note that, when position jam detection processing is not required in the paper conveying apparatus 100, this may be omitted.

Note that, when the central processing unit 150 detects that the front end of a paper is downstream of the first conveyor roller 116 and the first driven roller 117 by the third paper detection signal from the third paper detector 118, it controls the drive unit 146 to stop the rotation of the paper feed roller 111 and retard roller 112 so that the next paper is not fed. After that, when the central processing unit 150 detects the rear end of the paper downstream of the paper feed roller 111 and the retard roller 112 by the second paper detection signal from the second paper detector 114, it again controls the drive unit 146 to rotate the paper feed roller 111 and retard roller 112 and convey the next paper. Due to this, the central processing unit 150 prevents a plurality of papers from being superposed in the conveyance path. For this reason, the position jam detector 154 may start counting the time at the point of time when the central processing unit 150 controls the drive unit 146 to rotate the paper feed roller 111 and the retard roller 112 and determine that a position jam has occurred when the third paper detector 118 does not detect the front end of a paper within a predetermined time.

Figure 12:
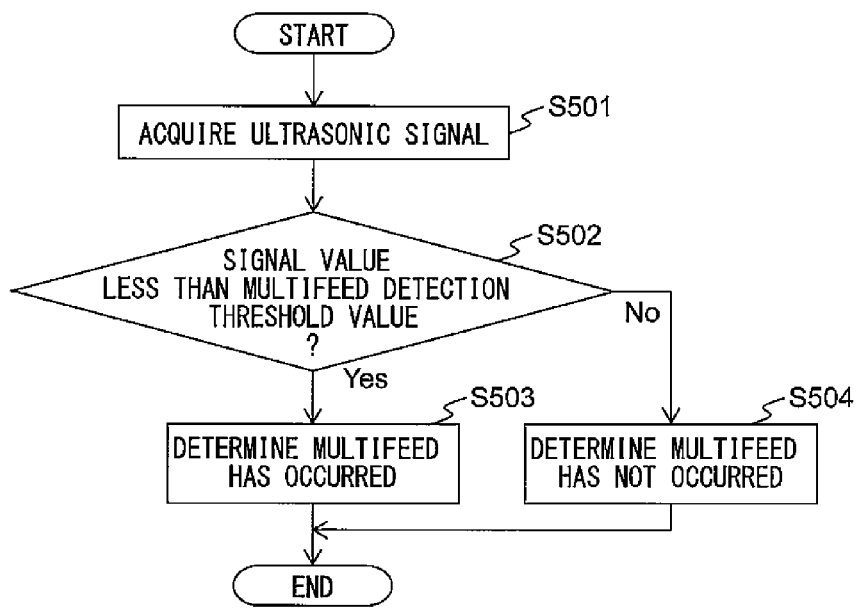
FIG. 12 is a flow chart which shows an example of the operation of a multifeed detection processing.

FIG. 12 is a flow chart which shows an example of operation of multifeed detection processing.

The flow of operation which is shown in FIG. 12 is executed at step S203 of the flow chart which is shown in FIG. 7.

First, the multifeed detector 155 acquires an ultrasonic signal from the ultrasonic sensor 115 (step S501).

Next, the multifeed detector 155 determines whether the signal value of the acquired ultrasonic signal is less than the multifeed detection threshold value (step S502).

Figure 13:
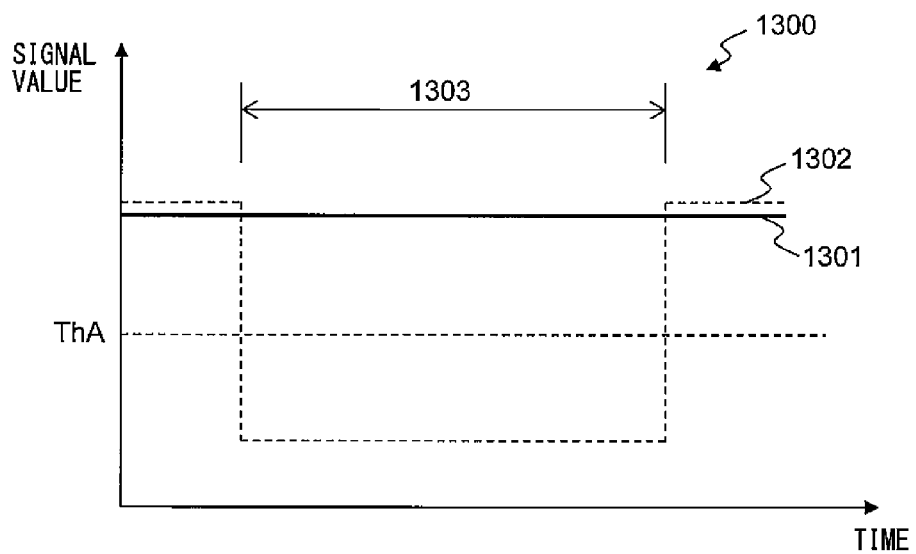
FIG. 13 is a view for explaining properties of an ultrasonic signal.

FIG. 13 is a view for explaining properties of an ultrasonic signal.

In the graph 1300 of FIG. 13, the solid line 1301 shows the characteristic of the ultrasonic signal in the case where a single paper is conveyed, while the broken line 1302 shows the characteristic of the ultrasonic signal in the case where multifeed of papers has occurred. The abscissa of the graph 1300 shows the time, while the ordinate shows the signal value of the ultrasonic signal. Due to the occurrence of multifeed, the signal value of the ultrasonic signal of the broken line 1302 falls in the section 1303. For this reason, it is possible to determine whether multifeed of papers has occurred by whether the signal value of the ultrasonic signal is less than the multifeed detection threshold value ThA.

The multifeed detector 155 determines that multifeed of the papers has occurred when the signal value of the ultrasonic signal is less than the multifeed detection threshold value (step S503), determines that multifeed of the papers has not occurred when the signal value of the ultrasonic signal is the multifeed detection threshold value or more (step S504), and ends the series of steps.

As explained in detail above, the paper conveying apparatus 100 determines whether a jam has occurred based on the corrected signal which holds the peaks of the analog sound signal, so even if the length of the sound generated by a jam is short, that sound can be accurately detected. Therefore, the paper conveying apparatus 100 can precisely determine the presence of occurrence of a jam.

Further, the paper conveying apparatus 100 is able to reliably detect the sound generated due to a jam even if the sampling interval of analog/digital conversion is long, so it becomes possible to lengthen the interval for performing sound jam detection processing and lower the processing load of the CPU. Therefore, as the CPU of the paper conveying apparatus 100, it becomes possible to use a low performance, low priced CPU.

Further, the paper conveying apparatus 100, separate from holding the peak of the analog sound signal by hardware control, holds the peak of the digital sound signal by software control. The paper conveying apparatus 100 can reliably detect the sound generated by a jam by a peak hold operation by hardware control while easily changing the hold interval for a peak hold operation by software control and can flexibly change the method of detection of a sound jam.

Figure 14:
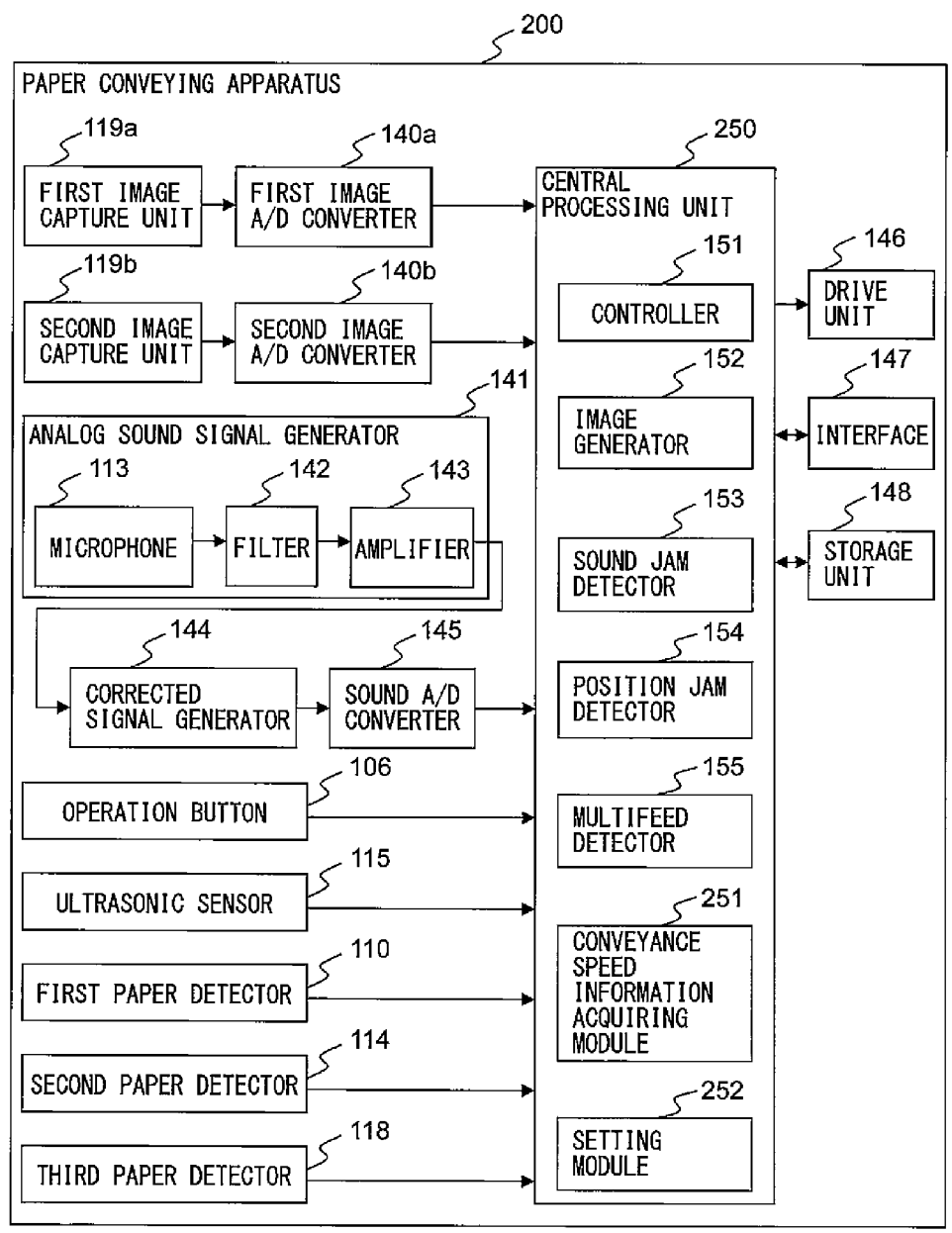
FIG. 14 is a block diagram which shows an example of the schematic configuration of a paper conveying apparatus 200 according to another embodiment.

FIG. 14 is a block diagram which shows an example of the schematic configuration of the paper conveying apparatus 200 in another embodiment.

The paper conveying apparatus 200 which is shown in FIG. 14, compared with the paper conveying apparatus 100 which is shown in FIG. 3, mounts a conveyance speed information acquiring module 251 and setting module 252 as functional modules of the center processing unit 250. Further, the storage unit 148 stores user setting information which includes information on the resolution for reading a paper.

Figure 15:
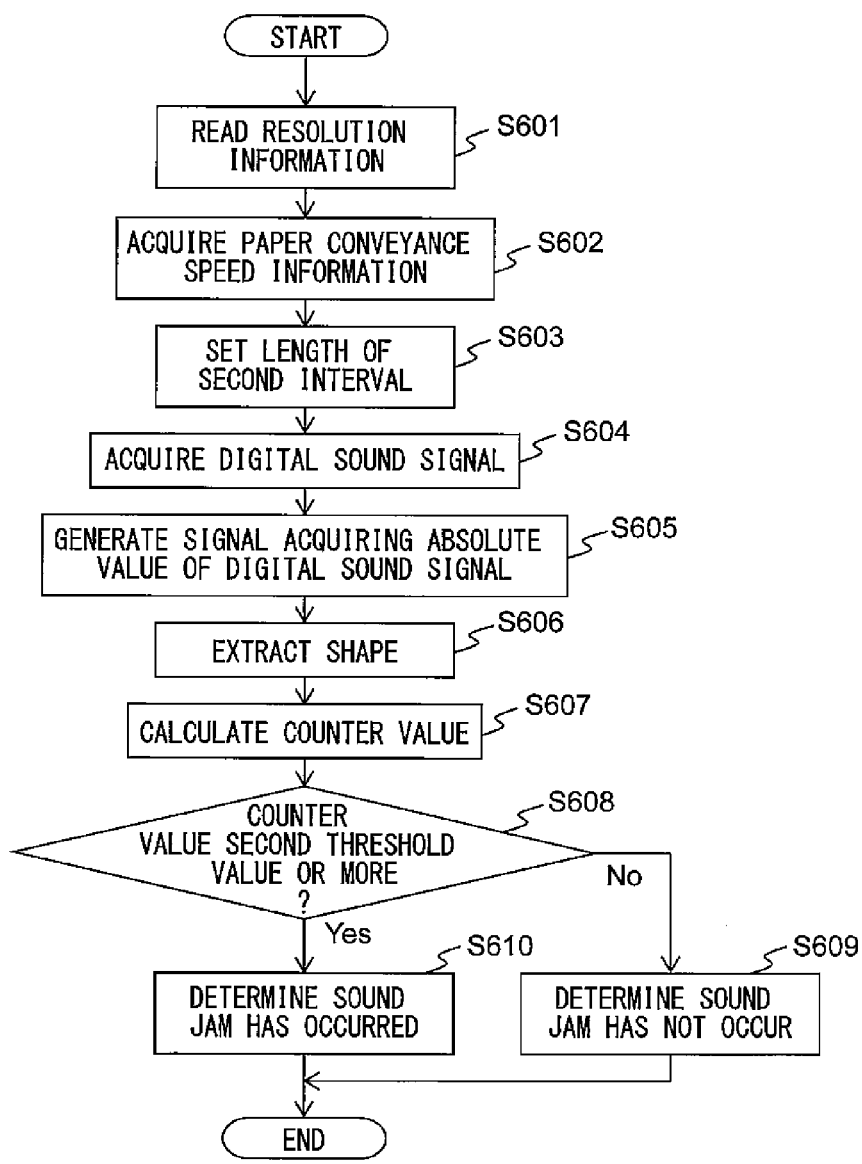
FIG. 15 is a flow chart which shows another example of the operation of a sound jam detection processing.

FIG. 15 is a flow chart which shows another example of the operation of a sound jam detection processing.

This flow chart can be followed in the paper conveying apparatus 200 instead of the flow chart which is shown in the above-mentioned FIG. 8. In the flow chart which is shown in FIG. 15, unlike the flow chart which is shown in FIG. 8, the length of the hold interval at the peak hold signal generated by the sound jam detector 153, that is, the second interval, is set. The processing of steps S604 to S610 which is shown in FIG. 15 is the same as the processing of steps S301 to S307 which is shown in FIG. 8, so the explanation will be omitted. Below, only the processing of steps S601 to S603 will be explained.

First, the conveyance speed information acquiring module 251 reads the resolution information in the user setting information from the storage unit 148 (step S601). Note that, the user setting information is set from the information processing apparatus 10 through an interface 147.

Figure 16:
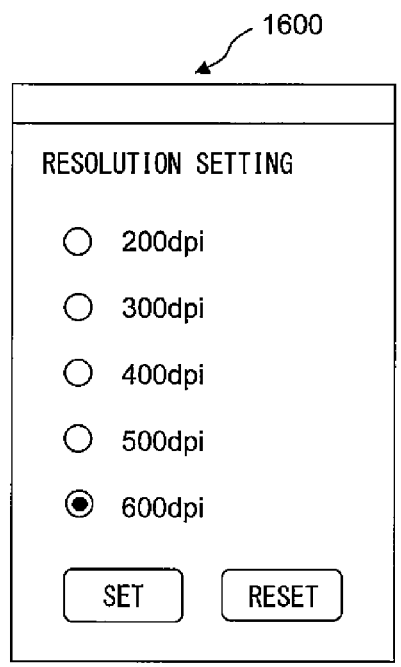
FIG. 16 is a view which shows an example of a setting screen 1600 of a resolution for reading a paper.

FIG. 16 shows an example of the setting screen 1600, which the information processing apparatus 10 displays, of the resolution for reading the paper.

As shown in FIG. 16, the setting screen 1600 displays a select button for the user to select the resolution for reading a paper. When the resolution is selected by a user and the set button is depressed, the information processing apparatus 10 transmits resolution information which shows the selected resolution to the paper conveying apparatus 100. When the interface 147 of the paper conveying apparatus 200 receives resolution information from the information processing apparatus 10, it sends the received resolution information to the center processing unit 250. The center processing unit 250 stores the resolution information received from the interface 147 as user setting information in the storage unit 148 and sets the rotational speed of the drive unit 146 in accordance with the resolution information to set the conveyance speed of the paper. The conveyance speed is set so as to become faster the smaller the resolution and to become slower the larger the resolution. For example, the conveyance speed when the resolution is 200 dpi (dots per inch) is set to 60 ppm (page per minute), while the conveyance speed when the resolution is 600 dpi is set to 15 ppm.

Next, the conveyance speed information acquiring module 251 acquires the conveyance speed information which shows the conveyance speed of the paper set by the central processing unit 250 based on the read resolution information (step S602).

Next, the setting module 252 sets the length of the hold interval in the peak hold signal generated by the sound jam detector 153 in accordance with the conveyance speed information which the conveyance speed information acquiring module 251 acquires, that is, the second interval (step S603). The second interval is set to become shorter the faster the conveyance speed and to become longer the slower the conveyance speed and is set so that the length of the second interval and the conveyance speed become inversely proportional. For example, when the conveyance speed is 60 ppm, the second interval is set to 15 msec, while when the conveyance speed is 15 ppm, the second interval is set to 60 msec.

Figure 17A:
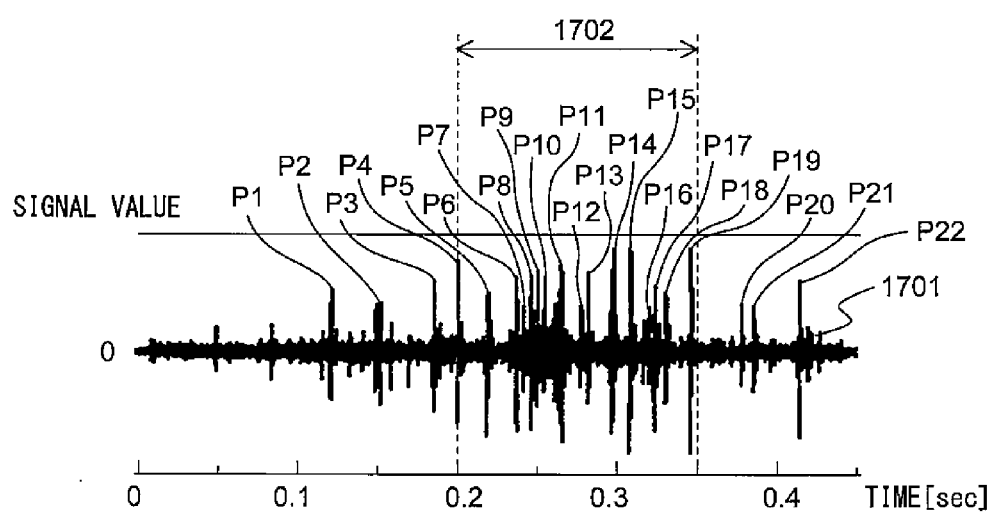
FIG. 17A is a graph which shows an example of a digital sound signal in the case where a jam occurs.
Figure 17B:
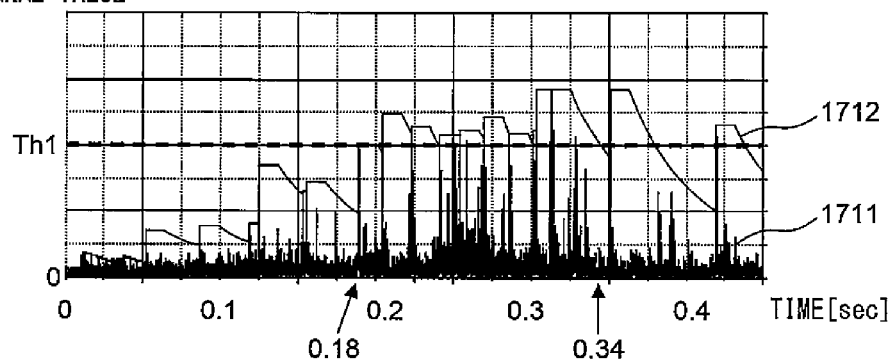
FIG. 17B is a graph which shows an example of a peak hold signal in the case where a jam occurs.
Figure 17C:
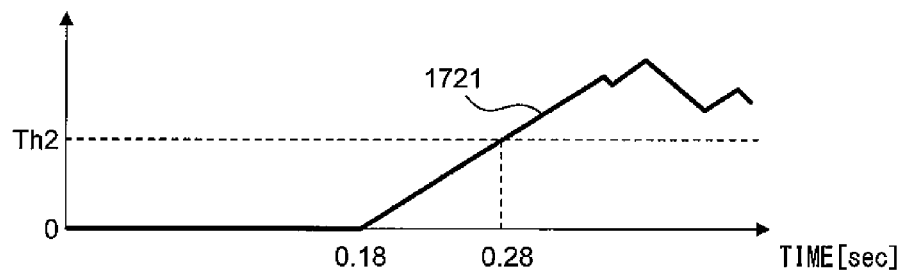
FIG. 17C is a graph which shows an example of a shape signal in the case where a jam occurs.

FIG. 17A, FIG. 17B, and FIG. 17C are respectively graphs which show examples of the digital sound signal, peak hold signal, and counter value at the time a jam occurs in the case where a paper is conveyed at a high speed (60 ppm) and the second interval is set to 15 msec.

In FIG. 17A, FIG. 17B, and FIG. 17C, the abscissas show the time, in FIG. 17A and FIG. 17B, the ordinates show the signal value, and in FIG. 17C, the ordinate shows the counter value. In FIG. 17A, the signal 1701 shows a digital sound signal. In FIG. 17B, the signal 1711 shows a signal which acquires the absolute value of the digital sound signal 1701 of FIG. 17A, while the signal 1712 shows a peak hold signal extracted as the shape signal of the signal 1711. In FIG. 17C, the graph 1721 shows the counter value calculated for the peak hold signal 1712 of FIG. 17B.

In FIG. 17B, the peak hold signal 1712 becomes a first threshold value Th1 or more at the time 0.18 second, then does not become less than the first threshold value Th1 up to the time 0.34 second. Therefore, as shown in FIG. 17C, the counter value increases from the time 0.18 second and becomes a second threshold value Th2 or more at the time 0.28 second, whereby the sound jam detector 153 determines that a sound jam has occurred.

Figure 18A:
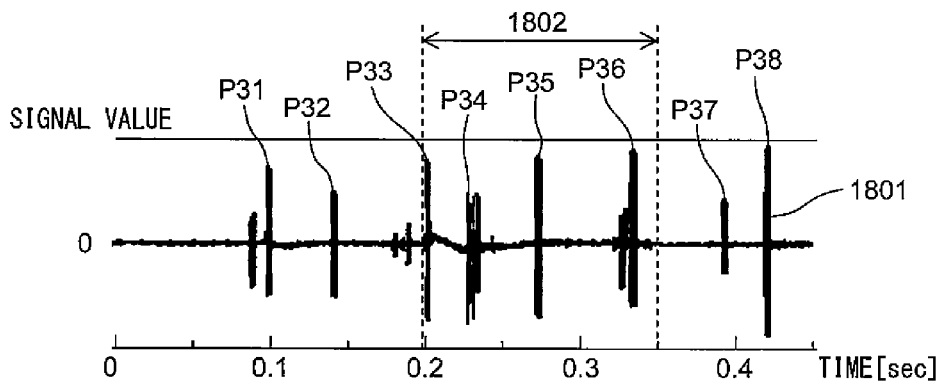
FIG. 18A is a graph which shows an example of a digital sound signal in the case where a jam occurs.
Figure 18B:
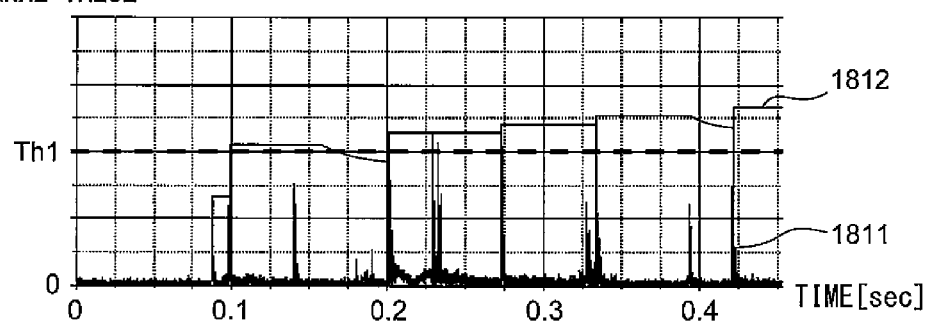
FIG. 18B is a graph which shows an example of a peak hold signal in the case where a jam occurs.
Figure 18C:
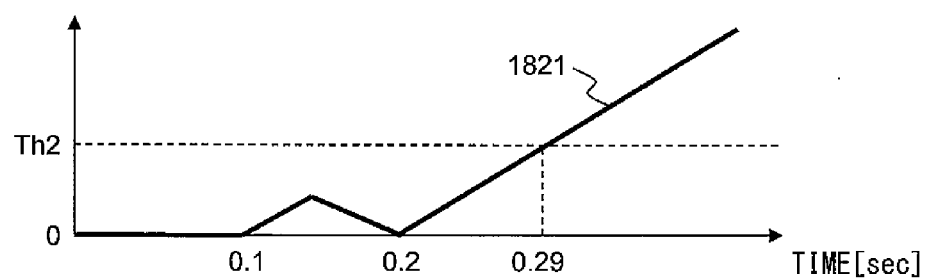
FIG. 18C is a graph which shows an example of a shape signal in the case where a jam occurs.

FIG. 18A, FIG. 18B, and FIG. 18C are respectively graphs which show examples of the digital sound signal, peak hold signal, and counter value when a jam occurs in the case where a paper is conveyed at a low speed (15 ppm) and the second interval is set to 60 msec.

In FIG. 18A, FIG. 18B, and FIG. 18C, the abscissas show the time, in FIG. 18A and FIG. 18B, the ordinates show the signal value, and in FIG. 18C, the ordinate shows the counter value. In FIG. 18A, the signal 1801 shows a digital sound signal. In FIG. 18B, the signal 1811 shows a signal acquiring the absolute value of the digital sound signal 1801 of FIG. 18A, while the signal 1812 shows the peak hold signal extracted as a shape signal of the signal 1811. In FIG. 18C, the graph 1821 shows the counter value calculated for the peak hold signal 1812 of FIG. 18B.

In FIG. 18A, the digital sound signal 1801, in the same way as the digital sound signal 1701 of FIG. 17A, shows a digital sound signal of 0.45 second length.

In FIG. 18B, the peak hold signal 1812 becomes the first threshold value Th1 or more at the time 0.2 second, then does not become less than the first threshold value Th1. For this reason, as shown in FIG. 18C, the counter value increases from the time 0.2 second and becomes the second threshold value Th2 or more at the time 0.29 second, whereby the sound jam detector 153 determines that a sound jam has occurred.

Below, the reason for setting the length of the second interval in accordance with the conveyance speed information will be explained.

The sound generated by a jam is generated due to deformation of the paper. If a paper being conveyed starts to deform, the more the paper moves, the greater the degree of deformation and the larger the sound generated every time the paper deforms. For this reason, when a jam occurs, the timing at which a large sound is generated due to a jam tends to be synchronized with the timing at which a paper moves by a predetermined distance. On the other hand, the time by which a paper moves by a predetermined distance is inversely proportional to the conveyance speed of the paper. For this reason, the interval during which a large sound is generated due to a jam tends to be inversely proportional to the conveyance speed of the paper.

In the digital sound signal 1701 when the paper is conveyed at 60 ppm, which is shown in FIG. 17A, peak values P1 to P22 appear along with movement of the paper in the jammed state. On the other hand, in the digital sound signal 1801 when the paper is conveyed at 15 ppm, which is shown in FIG. 18A, peak values P31 to P38 appear along with movement of the paper in the jammed state. In the digital sound signal 1701, there are 16 peak values in the section 1702 of 0.15 second length at which the peak values particularly concentrate, that is, the peak values P4 to P19. On the other hand, in the digital sound signal 1801, there are four peak values in the section 1802 of 0.15 second length at which the peak values particularly concentrate, that is, the peak values P33 to P36. That is, the interval between timings when peak values appear in the section 1702 is about ¼ of the interval between timings when peak values appear in the section 1802. On the other hand, the conveyance speed for the digital sound signal 1701 is about four times the conveyance speed for the digital sound signal 1801, so the intervals between timings when peak values appear in the section 1702 and the section 1802 become substantially inversely proportional to the conveyance speed of the paper.

The setting module 252 sets the length of the second interval so that the length of the second interval and the conveyance speed become inversely proportional. Therefore, the length of the period during which the peak value exceeds the threshold value Th1 in the peak hold signal can be made substantially constant regardless of the conveyance speed of the paper.

Figure 19A:
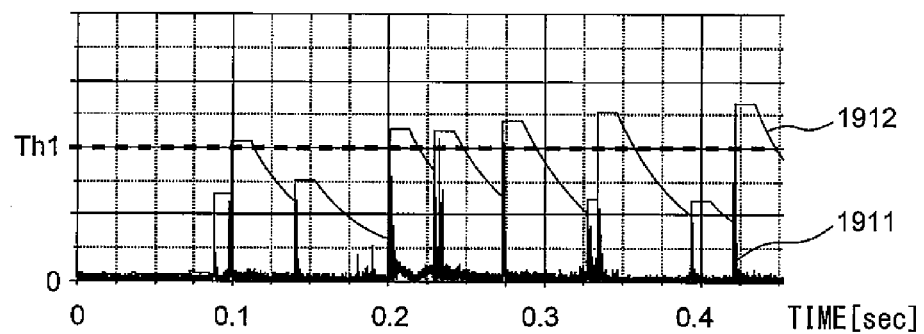
FIG. 19A is a graph which shows an example of a peak hold signal when changing the second interval.
Figure 19B:
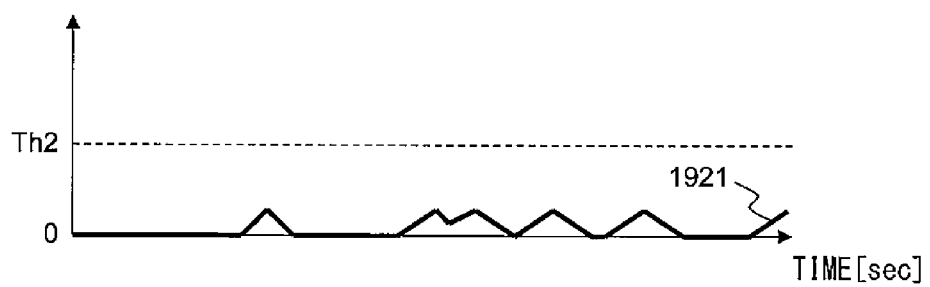
FIG. 19B is a graph which shows an example of a shape signal when changing the second interval.

FIG. 19A and FIG. 19B are respectively graphs which show examples of the peak hold signal which holds peak values of the digital sound signal 1801 which is shown in FIG. 18A at 15 msec and its counter value.

In FIG. 19A and FIG. 19B, the abscissas show the time, in FIG. 19A, the ordinate shows the signal value, and in FIG. 19B, the ordinate shows the counter value. In FIG. 19A, the signal 1911 shows a signal which acquires the absolute value of the digital sound signal 1801 of FIG. 18A, while the signal 1912 shows the peak hold signal extracted as a shape signal of the signal 1911. The peak hold signal 1912, for comparison with the peak hold signal 1812 of FIG. 18A, shows an example of acquiring the peak hold at a second interval (15 msec) the same as the case where the conveyance speed is a high speed (60 ppm) regardless of the conveyance speed being a low speed (15 ppm). The graph 1921 of FIG. 19B shows the counter value calculated for the peak hold signal 1912 of FIG. 19A.

The interval from when the peak value appears to when the next peak value appears is long, so the signal value of the peak hold signal 1912 of FIG. 19A, frequently becomes less than Th1 compared with the peak hold signal 1812 of FIG. 18B. The peak hold signal 1912 repeatedly becomes the first threshold value Th1 or more or becomes less than the first threshold value Th1. As shown in FIG. 19B, the counter value repeatedly increases and decreases. It does not become the second threshold value Th2 or more and it is not determined that a sound jam has occurred.

As illustrated in FIG. 19A to FIG. 19B, if setting the length of the second interval when the conveyance speed is a low speed, to be the same as when the conveyance speed is a high speed, there is the possibility that the signal value of the peak hold signal frequently becomes less than Th1 and the detection will be mistaken. For this reason, at the sound jam detector 153, it may be considered to set the first threshold value Th1, second threshold value Th2, or other parameters so as to detect a sound jam by using the optimum values in accordance with the conveyance speed of the paper. However, if changing the first threshold value Th1, second threshold value Th2, and other parameters, the signal value due to the conveyance sound of the paper, sound generated at the outside of the apparatus, and other sounds which are smaller than the sound generated by a jam becomes the first threshold value Th1 or more, the counter value becomes the second threshold value Th2 due to a sound which is extremely short in generation time, and there is a possibility of mistaken determining that a jam has occurred. For this reason, it is not easy to set the first threshold value Th1, the second threshold value Th2, and other parameters to uniformly change in accordance with the conveyance speed of the paper.

On the other hand, as explained above, if setting the length of the second interval in accordance with the conveyance speed, the possibility of mistakenly determining that a jam has occurred due to a sound which is smaller than the sound generated due to a jam or a sound which is extremely short is generation time. Therefore, the setting module 252 of the present embodiment sets the length of the second interval in accordance with the conveyance speed of the paper and can precisely determine the presence of occurrence of a jam without regard as to the conveyance speed of the paper.

As explained in detail above, the paper conveying apparatus 200 sets in real time the hold interval for acquiring the peak hold in accordance with the conveyance speed of the paper by software control, so it becomes possible to precisely determine the presence of occurrence of a jam without regard to the conveyance speed of a paper.

Figure 20:
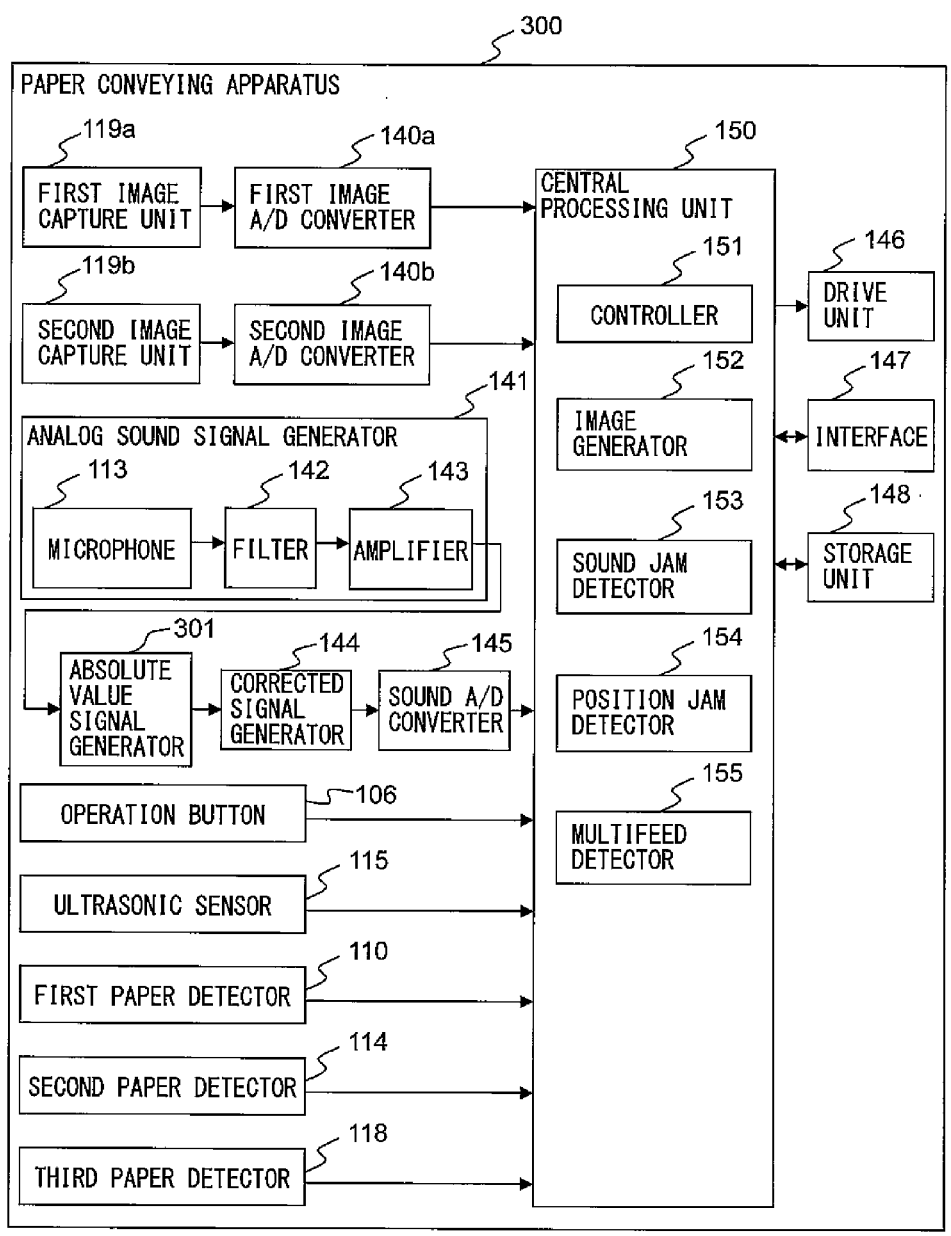
FIG. 20 is a block diagram which shows an example of the schematic configuration of a paper conveying apparatus 300 according to still another embodiment.

FIG. 20 is a block diagram which shows an example of the schematic configuration of a paper conveying apparatus 300 in still another embodiment.

The paper conveying apparatus 300 which is shown in FIG. 20 has an absolute value signal generator 301 in addition to the parts of the paper conveying apparatus 100 which is shown in FIG. 3. The absolute value signal generator 301 generates an absolute value signal which acquires the absolute value of the analog sound signal, while the corrected signal generator 144 uses the absolute value signal to generate the corrected signal.

The absolute value signal generator 301 has an absolute value circuit which outputs an absolute value of the input signal and generates an absolute value signal which acquires the absolute value of the analog sound signal output from the analog sound signal generator 141 and outputs it to the corrected signal generator 144. The corrected signal generator 144 generates a signal which holds peak values of the absolute value signal output from the absolute value signal generator 301, every first interval as a corrected signal and outputs it to the sound A/D converter 145.

As explained above, in the paper conveying apparatus 300, the absolute value signal generator 301 generates an absolute value signal acquiring the absolute value of the analog sound signal, while the corrected signal generator 144 uses the absolute value signal to generate the corrected signal. The paper conveying apparatus 300 becomes able to reliably detect the part with a large negative amplitude in the analog sound signal and becomes able to more reliably detect the sound generated at the time when a jam occurs.

Figure 21:
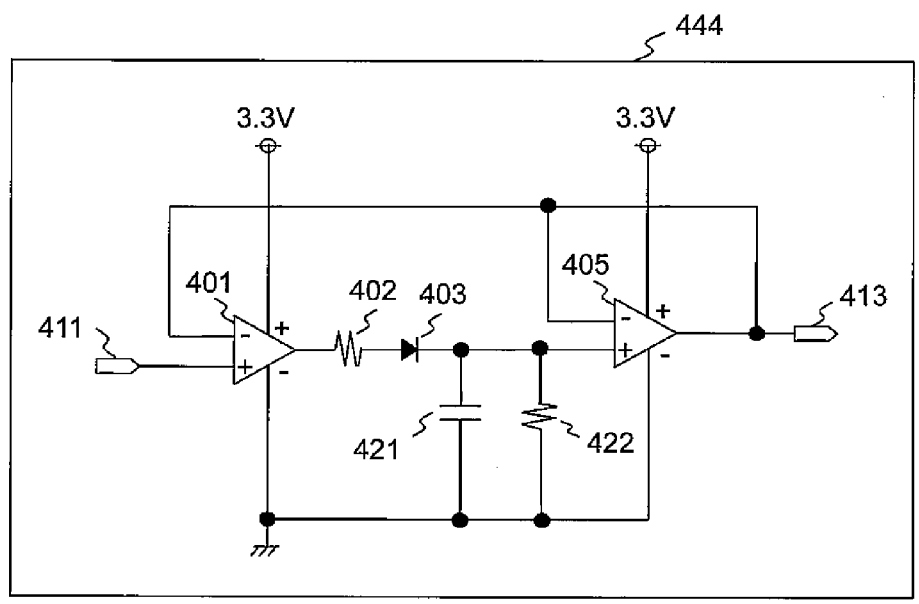
FIG. 21 is a view which shows an example of a circuit which forms part of the corrected signal generator 444 of the paper conveying apparatus 400 according to still another embodiment.

FIG. 21 shows an example of a circuit which forms part of the corrected signal generator 444 of the paper conveying apparatus 400 in still another embodiment.

The corrected signal generator 444 which is shown in FIG. 21 does not have, among the parts of the corrected signal generator 14 which is shown in FIG. 4, the capacitor 404, resistor 406, n-channel type FET 407, and input terminal 412. Instead, it has a capacitor 421 and resistor 422.

The mode of connection of the operational amplifiers 401, 405 and diode 403 is similar to the mode of connection in the corrected signal generator 144 which is shown in FIG. 4. One end of the capacitor 421 is connected to the cathode of the diode 403, while the other terminal of the capacitor 421 is connected to the ground. One end of the resistor 422 is connected to one end of the capacitor 421, while the other end of the resistor 422 is connected to the other end of the capacitor 421.

The operational amplifiers 401, 405 and diodes 403 operate in a similar way as the corrected signal generator 144 which is shown in FIG. 4. However, the charge of the capacitor 421 is not discharged in accordance with a request from the sound A/D converter 145. When the input voltage reaches a voltage corresponding to the output voltage, the charge of the capacitor 421 is gradually discharged through the resistor 422.

The corrected signal generator 444 outputs a signal which detects the analog sound signal output from the analog sound signal generator 141 by the above circuit as a corrected signal to the sound A/D converter 145. The size of the resistor 422 is set to size by which the capacitor 421 is discharged at a suitable speed so that the peak value of the analog sound signal does not attenuate so as to no longer be detectable after the elapse of the sampling interval in analog/digital conversion.

Figure 22:
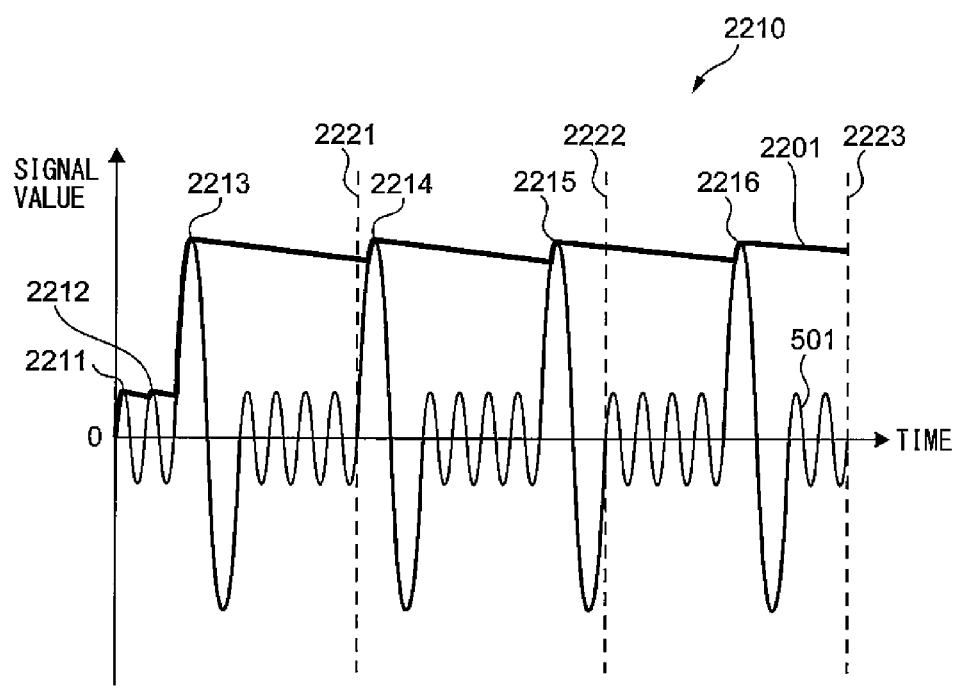
FIG. 22 is a graph which shows an example of a corrected signal acquired by detecting an analog sound signal.

FIG. 22 is a graph which shows an example of the corrected signal acquired by detecting the analog sound signal.

The graph 2210 which is shown in FIG. 22 shows an example of the corrected signal 2201 acquired by detecting the analog sound signal 501 which is shown in FIG. 5A. In FIG. 22, the abscissa shows the time, while the ordinate shows the signal value.

In FIG. 22, the corrected signal 2201 becomes a signal which gradually attenuates along with discharge of the capacitor 421 after the peak values 2211 to 2216 are generated in the analog sound signal 501. The corrected signal 2201 is sampled at the timings 2221 to 2223 by the sound A/D converter 145. The sound A/D converter 145 cannot necessarily generate a digital sound signal by using the peak values of the analog sound signal 501, but can generate a digital sound signal by using values which are close to the peak values.

As explained in detail above, the paper conveying apparatus 400 determines whether a jam has occurred based on the corrected signal acquired by detecting the analog sound signal, so even when the length of the sound generated at the time a jam has occurred is short, the sound can be accurately detected. Therefore, the paper conveying apparatus 400 becomes able to accurately determine the presence of occurrence of a jam due to a sound.

According to the paper conveying apparatus, it is determined whether a jam has occurred based on a signal corrected by processing an analog sound signal to hold the peaks or detecting the waveform, so it is possible to accurately detect the sound even if the length of the sound generated due to the jam is short and possible to accurately determine the presence of occurrence of a jam by sound.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A paper conveying apparatus comprising:
    an analog sound signal generator for generating an analog sound signal corresponding to a sound generated by a paper during conveyance of the paper;
    a corrected signal generator for generating a signal acquiring a peak hold of the analog sound signal or a signal detecting the analog sound signal, as a corrected signal;
    a digital converter for sampling the corrected signal and converting the corrected signal to a digital format to generate a digital sound signal; and
    a sound jam detector for determining whether a jam has occurred based on the digital sound signal.

2. The paper conveying apparatus according to claim 1, wherein the corrected signal generator generates a signal holding peak values of the analog sound signal every first interval as the corrected signal.

3. The paper conveying apparatus according to claim 1, wherein the sound jam detector determines whether a jam has occurred based on a shape signal which extracts the shape of the digital sound signal.

4. The paper conveying apparatus according to claim 2, wherein the sound jam detector generates a signal acquiring a peak hold of the digital sound signal every second interval, longer than the first interval as the shape signal.

5. The paper conveying apparatus according to claim 4, further comprising:
- a conveyance speed information acquiring module for acquiring conveyance speed information of the paper and
- a setting module for setting a length of the second interval in accordance with the conveyance speed information.

6. The paper conveying apparatus according to claim 1, further comprising an absolute value signal generator for generating an absolute value signal acquiring an absolute value of the analog sound signal, wherein
- the corrected signal generator uses the absolute value signal to generate the corrected signal.

* * * * *